(12) United States Patent
Murata

(10) Patent No.: US 7,511,937 B2
(45) Date of Patent: Mar. 31, 2009

(54) ROTARY VARIABLE CAPACITANCE ELEMENT AND ROTARY VARIABLE CAPACITANCE DEVICE

(75) Inventor: Shinji Murata, Fukushima-ken (JP)

(73) Assignee: ALPS Electric Co., Ltd. (JP)

( * ) Notice: Subject to any disclaimer, the term of this patent is extended or adjusted under 35 U.S.C. 154(b) by 21 days.

(21) Appl. No.: 11/869,700

(22) Filed: Oct. 9, 2007

(65) Prior Publication Data

US 2008/0106843 A1 May 8, 2008

(30) Foreign Application Priority Data

Nov. 2, 2006 (JP) ............... 2006-299254

(51) Int. Cl.
*H01G 5/01* (2006.01)
(52) U.S. Cl. ............... 361/278; 361/277; 361/287; 361/290; 361/292; 361/283.3
(58) Field of Classification Search ............ 361/278, 361/272–273, 277, 283.1, 283.2, 287–290, 361/292, 302–305; 333/134, 135, 174
See application file for complete search history.

(56) References Cited

U.S. PATENT DOCUMENTS

| 5,901,031 | A | 5/1999 | Ishige et al. |
| 6,242,989 | B1 * | 6/2001 | Barber et al. ............ 331/177 V |
| 6,690,568 | B2 * | 2/2004 | Johnson ............... 361/277 |
| 6,813,135 | B2 * | 11/2004 | Nakamura et al. ......... 361/277 |
| 6,833,985 | B2 * | 12/2004 | Fujii et al. ............ 361/281 |
| 7,027,284 | B2 * | 4/2006 | Kobayashi et al. ........ 361/278 |
| 7,054,132 | B2 * | 5/2006 | Yoshida et al. ........... 361/277 |
| 7,085,122 | B2 * | 8/2006 | Wu et al. ................ 361/277 |
| 7,177,134 | B2 * | 2/2007 | Ikehashi et al. ......... 361/278 |

FOREIGN PATENT DOCUMENTS

JP          10-79324         3/1998

* cited by examiner

*Primary Examiner*—Nguyen T Ha
(74) *Attorney, Agent, or Firm*—Beyer Law Group LLP

(57) ABSTRACT

A variable capacitance element of the invention includes: a columnar vibrator formed inside a cylindrical hole of a supporting wall; a first circular driving electrode disposed above the columnar vibrator; a first circular capacitive electrode disposed in the middle of the columnar vibrator; a second circular driving electrode disposed on the periphery of the cylindrical hole of the supporting wall; and a second circular capacitive electrode disposed on an inner side surface of the supporting wall. An electrostatic force is increased or decreased sequentially in the circumferential direction of the second driving electrode that is divided into four parts by sequentially increasing or decreasing the driving voltage in the circumferential direction of the second driving electrode. As a result, the columnar vibrator is rotated to change the electrostatic capacitance between the first capacitive electrode and the second capacitive electrode.

11 Claims, 18 Drawing Sheets

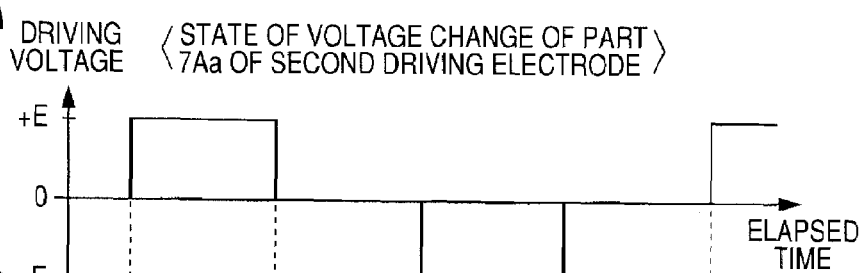

FIG. 8A  DRIVING VOLTAGE ⟨STATE OF VOLTAGE CHANGE OF PART 7Aa OF SECOND DRIVING ELECTRODE⟩

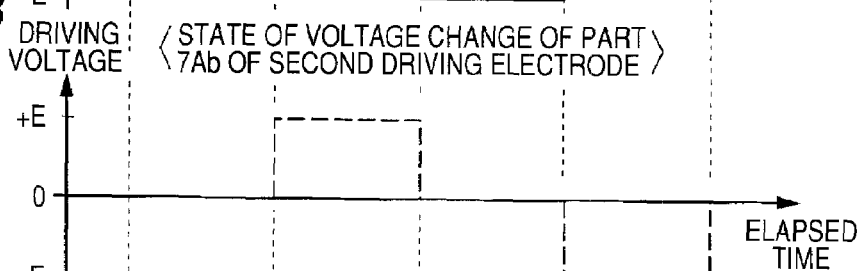

FIG. 8B  DRIVING VOLTAGE ⟨STATE OF VOLTAGE CHANGE OF PART 7Ab OF SECOND DRIVING ELECTRODE⟩

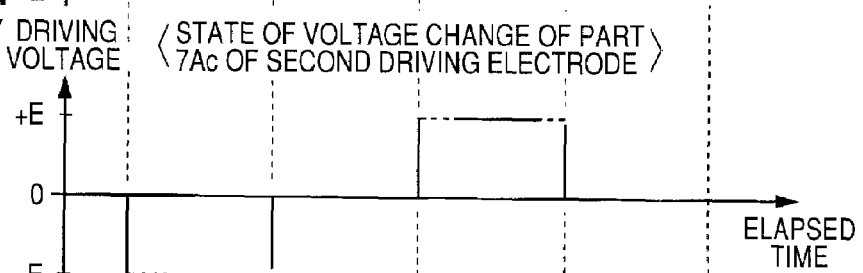

FIG. 8C  DRIVING VOLTAGE ⟨STATE OF VOLTAGE CHANGE OF PART 7Ac OF SECOND DRIVING ELECTRODE⟩

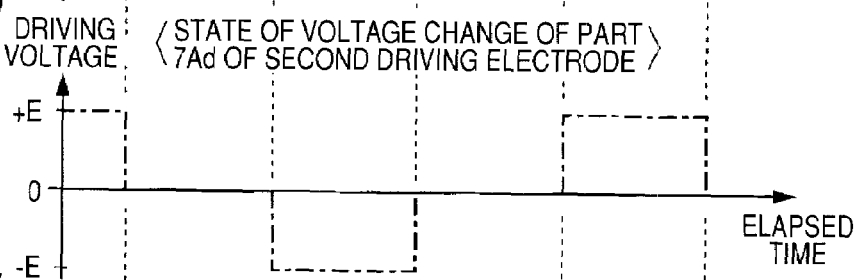

FIG. 8D  DRIVING VOLTAGE ⟨STATE OF VOLTAGE CHANGE OF PART 7Ad OF SECOND DRIVING ELECTRODE⟩

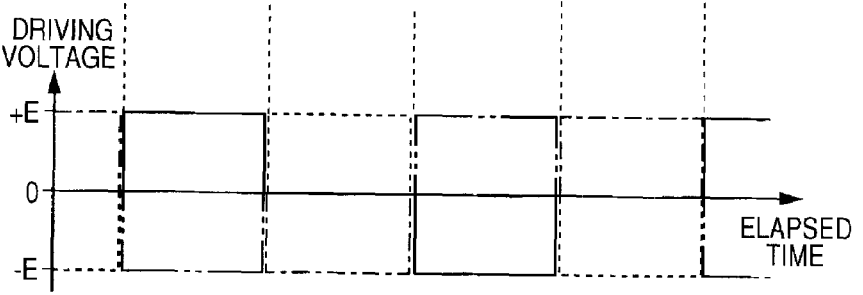

FIG. 8E  DRIVING VOLTAGE

ROTARY VARIABLE CAPACITANCE ELEMENT AND ROTARY VARIABLE CAPACITANCE DEVICE

BACKGROUND OF THE INVENTION

1. Field of the Invention

The present invention relates to a variable capacitance element and a variable capacitance device, and in particular, to a variable capacitance element that changes an opposite distance between capacitive electrodes using an electrostatic force generated by application of a driving voltage and a variable capacitance device having the variable capacitance element.

2. Description of the Related Art

In general, a variable capacitance element is provided as a variable-capacitance capacitor in an electronic circuit, such as an oscillation circuit and a modulation circuit, in order to change an electrostatic capacitance such that a desired output can be obtained in the electronic circuit. For example, when the variable capacitance element is used in an MEMS, the electrostatic capacitance between electrodes is changed by forming the variable capacitance element in a three-dimensional shape so that the opposite distance between the electrodes can be freely changed.

An example of a known variable capacitance element 102 is shown in FIGS. 21 and 22. The known variable capacitance element 102 includes a supporting substrate 105, a cantilever 104, a fixed electrode 107, and a movable electrode 106, as shown in FIGS. 21 and 22. The cantilever 104 is formed in a crank shape, and an end 104a of the cantilever 104 is fixed as a supporting end on a surface of the supporting substrate 105. Furthermore, the plate-shaped movable electrode 106 is disposed on a surface of the cantilever 104 opposite the supporting substrate 105, and the plate-shaped fixed electrode 107 is disposed on a surface of the supporting substrate 105 opposite the movable electrode 106. The widths of the cantilever 104 and the movable electrode 106 are decreased toward the front end side from the supporting end side. In addition, when a driving voltage is applied between the fixed electrode 107 and the movable electrode 106, an electrostatic force is generated between the fixed electrode 107, and as a result, the movable electrode 106 and the cantilever 104 is deflected toward the supporting substrate 105 side. Thus, since the opposite distance between the fixed electrode 107 and the movable electrode 106 is increased or decreased by changing a driving voltage to adjust the electrostatic force, the electrostatic capacitance between the fixed electrode 107 and the movable electrode 106 is changed.

However, in order to increase the electrostatic capacitance between the movable electrode 106 and the fixed electrode 107 in the known variable capacitance element 102, a large driving voltage for increasing the amount of deflection of the cantilever 104 needs to be applied to make the distance between the movable electrode 106 and the fixed electrode 107 small and the state should be maintained. For this reason, it is necessary to continuously apply a large driving voltage in order to obtain a large electrostatic capacitance. As a result, a problem occurs that the power consumption of the variable capacitance element 102 and a variable capacitance device increases.

SUMMARY OF THE INVENTION

Therefore, the invention has been finalized in view of the drawbacks inherent in the related art, and it is an object of the invention to provide a variable capacitance element capable of obtaining a large electrostatic capacitance with small power consumption.

In addition, it is another object of the invention to provide a variable capacitance device includes the variable capacitance element capable of obtaining a large electrostatic capacitance with small power consumption.

In order to achieve the above objects, according to a first aspect of the invention, a variable capacitance element includes: a columnar vibrator that stands up from an insulating surface; a first driving electrode and a first capacitive electrode that are disposed on the periphery of an imaginary ring, which surrounds the columnar vibrator on a side surface of the columnar vibrator, or on the periphery of an imaginary ring located above the columnar vibrator; a second driving electrode that is spaced apart from the first driving electrode to the outside by a predetermined distance so as to be opposite to the first driving electrode and is disposed on the periphery of an imaginary ring that surrounds the columnar vibrator; a second capacitive electrode that is spaced apart from the first capacitive electrode to the outside by a predetermined distance so as to be opposite to the first capacitive electrode and is disposed on the periphery of an imaginary ring that surrounds the columnar vibrator; and a supporting wall that stands up from the insulating surface so as to surround the columnar vibrator and supports the second driving electrode and the second capacitive electrode.

In addition, in the variable capacitance element according to the first aspect of the invention, at least one of the first driving electrode and the second driving electrode are divided into three or more parts and the divided parts are disposed at equal distances. In addition, the columnar vibrator is bent toward an arrangement side of the second driving electrode using a base of the columnar vibrator as a fixed end while being rotated in a circumferential direction of the second driving electrode by sequentially increasing or decreasing a driving voltage applied between the first and second driving electrodes in the circumferential direction of the first driving electrode or the second driving electrode divided into the parts so as to sequentially increase or decrease an electrostatic force generated between the first and second driving electrodes in the circumferential direction, thereby freely changing an opposite distance between the first capacitive electrode and the second capacitive electrode.

In the variable capacitance element according to the first aspect of the invention, it is possible to freely change the opposite distance between the first capacitive electrode and the second capacitive electrode while rotating the columnar vibrator in the circumferential direction by sequentially applying the driving voltage in the circumferential direction. As a result, it is possible to freely change the electrostatic capacitance between the first capacitive electrode and the second capacitive electrode. In addition, since resonance is used for the rotation of the columnar vibrator, it is possible to increase the displacement amount of the columnar vibrator without applying a large driving voltage. As a result, a desired electrostatic capacitance can be obtained with a small driving voltage.

Further, according to a second aspect of the invention, in the variable capacitance element according to the first aspect of the invention, one pair of electrodes of a first pair of electrodes including the first driving electrode and the first capacitive electrode and a second pair of electrodes including the second driving electrode and the second capacitive electrode are arranged to be divided in an up and down direction of the columnar vibrator or the supporting wall, and the other pair of electrodes are arranged on the supporting wall or the columnar vibrator corresponding to arrangement of the one pair of electrodes.

In the variable capacitance element according to the second aspect of the invention, the first capacitive electrode or the second capacitive electrode can be arranged to be close to each other or can be formed in the circular shape without interposing the first capacitive electrode or the second capacitive electrode, which is arranged on the periphery, between the first driving electrode and the second driving electrode that is divided into parts. Accordingly, even if the columnar vibrator is rotated, the electrostatic capacitance between the first capacitive electrode and the second capacitive electrode can be maintained constant without being changed.

Furthermore, according to a third aspect of the invention, in the variable capacitance element according to the first aspect of the invention, one pair of electrodes of a first pair of electrodes including the first driving electrode and the first capacitive electrode and a second pair of electrodes including the second driving electrode and the second capacitive electrode are alternately arranged on the periphery of the same imaginary ring, and the other pair of electrodes are arranged on the supporting wall or the columnar vibrator corresponding to arrangement of the one pair of electrodes.

In the variable capacitance element according to the third aspect of the invention, all electrodes can be arranged near a front end of the columnar vibrator, and accordingly, it is possible to increase the bent amount of the columnar vibrator. As a result, since the opposite distance between the first capacitive electrode and the second capacitive electrode can be made smaller, it is possible to increase the electrostatic capacitance between the first capacitive electrode and the second capacitive electrode.

Furthermore, according to a fourth aspect of the invention, in the variable capacitance element according to the second or third aspect of the invention, one pair of electrodes of the first pair of electrodes and the second pair of electrodes are grounded and are integrally formed.

In the variable capacitance element according to the fourth aspect of the invention, it is not necessary to provide an insulating layer, such as an oxide layer or air, between the first driving electrode and the first capacitive electrode or between the second driving electrode and the second capacitive electrode in one of the pairs of electrodes that are integrally formed. Thus, it is possible to easily form one of the pairs of electrodes that are integrally formed.

Furthermore, according to a fifth aspect of the invention, in the variable capacitance element according to any one of the first to fourth aspects of the invention, the columnar vibrator and the supporting wall are formed by performing reactive ion etching on a single crystal silicon or an SOI (silicon on insulator).

In the variable capacitance element according to the fifth aspect of the invention, the columnar vibrator and the supporting wall that support each of the electrodes can be formed with precision, and accordingly, the opposite distance between the electrodes can be accurately set. In addition, since the SOI is used for the columnar vibrator or the supporting wall, the insulating layer made of the SOI can be used as an insulating surface from which the columnar vibrator and the supporting wall stand up or can be used an insulating layer interposed between the first driving electrode and the first capacitive electrode and between the second driving electrode and the second capacitive electrode.

Furthermore, according to a sixth aspect of the invention, in the variable capacitance element according to the fifth aspect of the invention, the columnar vibrator and the first pair of electrodes are integrally formed using the SOI when the first driving electrode and the first capacitive electrode are not electrically conducted to each other, and the columnar vibrator and the first pair of electrodes are integrally formed using the single crystal silicon or the SOI when the first driving electrode and the first capacitive electrode are electrically conducted to each other.

In the variable capacitance element according to the sixth aspect of the invention, the columnar vibrator can be used as the first driving electrode and the first capacitive electrode by forming the columnar vibrator with the single crystal silicon or the SOI. As a result, it is possible to maintain the opposite distance between the first pair of electrodes and the second pair of electrodes accurate and constant and to omit a process for separately forming the first driving electrode and the first capacitive electrode.

Furthermore, according to a seventh aspect of the invention, in the variable capacitance element according to the fifth or sixth aspect of the invention, the supporting wall and the second pair of electrodes are integrally formed using the SOI when the second driving electrode and the second capacitive electrode are not electrically conducted to each other, and the supporting wall and the second pair of electrodes are integrally formed using the single crystal silicon or the SOI when the supporting wall and the second pair of electrodes are electrically conducted to each other.

In the variable capacitance element according to the seventh aspect of the invention, the supporting wall can be used as the second driving electrode and the second capacitive electrode by forming the supporting wall with the single crystal silicon or the SOI. As a result, it is possible to maintain the opposite distance between the first pair of electrodes and the second pair of electrodes accurate and constant and to omit a process for separately forming the second driving electrode and the second capacitive electrode.

Furthermore, according to an eighth aspect of the invention, in the variable capacitance element according to any one of the first to seventh aspects of the invention, the columnar vibrator is formed in a cylindrical shape, and the supporting wall surrounds the cylindrical columnar vibrator in a circular shape.

In the variable capacitance element according to the eighth aspect of the invention, since the columnar vibrator is formed in the cylindrical shape, the opposite distance between electrodes when the columnar vibrator is rotated is maintained constant. As a result, it is possible to rotate the columnar vibrator while making the columnar vibrator closer to the supporting wall side as compared with a case in which the columnar vibrator having a prismatic shape is made to rotate.

Furthermore, according to a ninth aspect of the invention, in the variable capacitance element according to any one of the first to eighth aspects of the invention, a cover for holding a space between the columnar vibrator and the supporting wall in a vacuum state is further provided.

In the variable capacitance element according to the ninth aspect of the invention, it is possible to remove the air from the space between the columnar vibrator and the supporting wall. As a result, it is possible to prevent the columnar vibrator from damping due to the air when the columnar vibrator is bent toward the supporting wall side and the opposite distance between the first driving electrode and the second driving electrode from being changed.

In addition, in order to achieve the above objects, according to a tenth aspect of the invention, a variable capacitance device includes: the variable capacitance element according to any one of the first to ninth aspects of the invention; and an external power supply that applies a driving voltage, which has the same frequency as a resonating frequency of the columnar vibrator, to the first driving electrode or the second driving electrode that is divided into the parts, a phase of the driving voltage being changed in accordance with an arrangement angle of the first driving electrode or the second driving electrode that is disposed on the periphery of the imaginary ring so as to be divided into the parts.

In the variable capacitance device according to the tenth aspect of the invention, since the resonance can be used for the rotation of the columnar vibrator regardless of the bent amount of the columnar vibrator, it is possible to increase the bent amount of the columnar vibrator without applying a large driving voltage. As a result, a desired electrostatic capacitance can be obtained with a small driving voltage.

Furthermore, according to an eleventh aspect of the invention, in the variable capacitance device according to the tenth aspect of the invention, the external power supply applies a driving voltage having a sinusoidal wave to the divided first or second driving electrode.

In the variable capacitance device according to the tenth aspect of the invention, an increase or decrease in an electrostatic force generated between the first driving electrode and the second driving electrode is smoothly repeated. Accordingly, it is possible to smoothly rotate the columnar vibrator 4A as compared with a case in which a driving voltage having a square wave is applied.

According to the variable capacitance element and the variable capacitance device described above, since the resonance can be used for the rotation of the columnar vibrator without depending on the bent amount of the columnar vibrator, it is possible to obtain the desired electrostatic capacitance even if a driving voltage is small. In addition, according to the variable capacitance element and the variable capacitance device described above, it is possible to obtain a large electrostatic capacitance with small power consumption.

BRIEF DESCRIPTION OF THE DRAWINGS

FIGS. 8A to 8D are graphs illustrating curves of driving voltages applied to parts of a second driving electrode divided into four equal parts, each of the driving voltages having a square wave and a phase difference between the driving voltages being 90° in the order of FIGS. 8A to 8D;

FIG. 8E is a graph obtained by overlapping curves of the driving voltages having square waves shown in FIGS. 8A to 8D;

DESCRIPTION OF THE PREFERRED EMBODIMENT

Hereinafter, variable capacitance elements and variable capacitance devices according to first to third embodiments of the invention will be described with reference to FIGS. 1 to 16.

Figure 1:
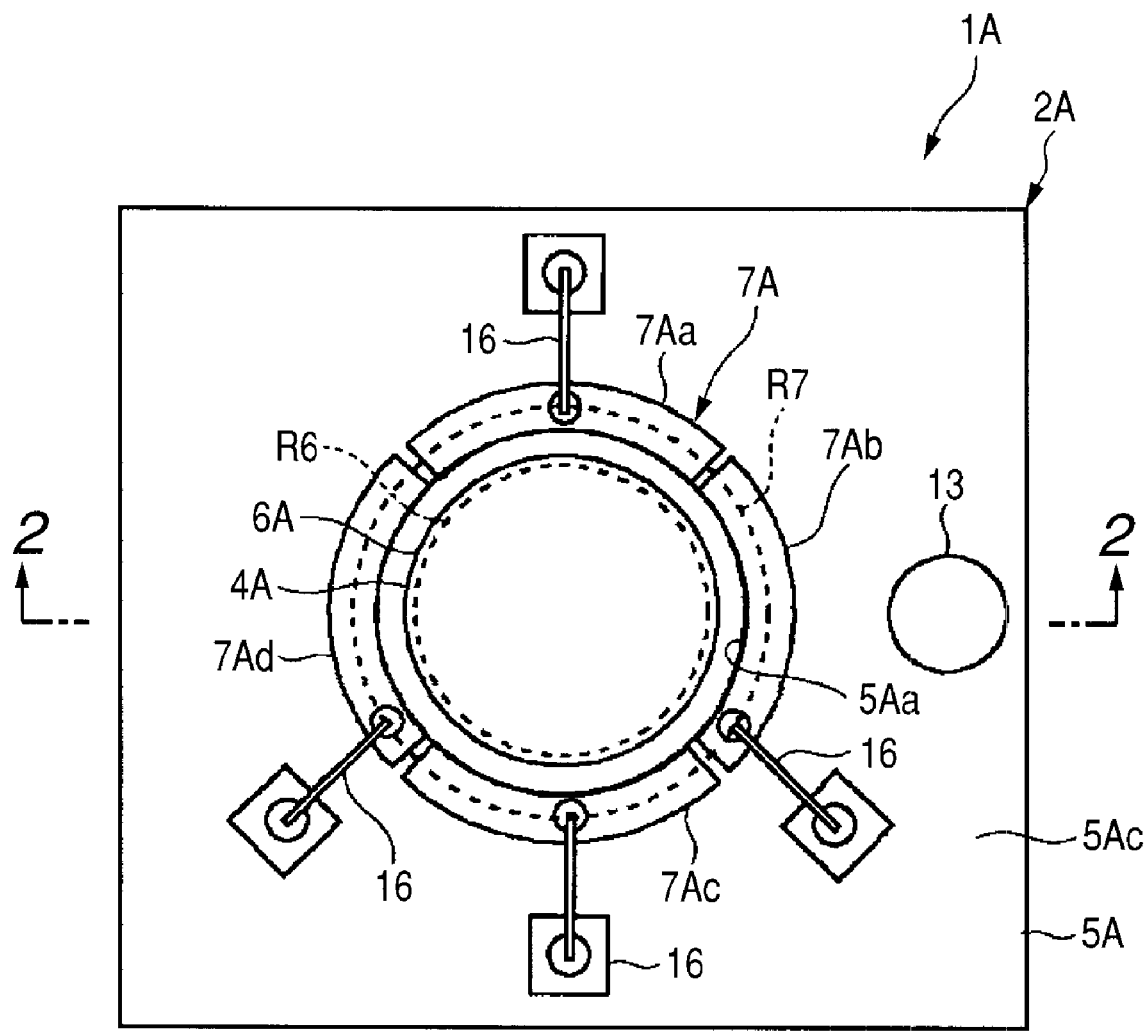
FIG. 1 is a plan view illustrating a variable capacitance element according to a first embodiment.
Figure 2:
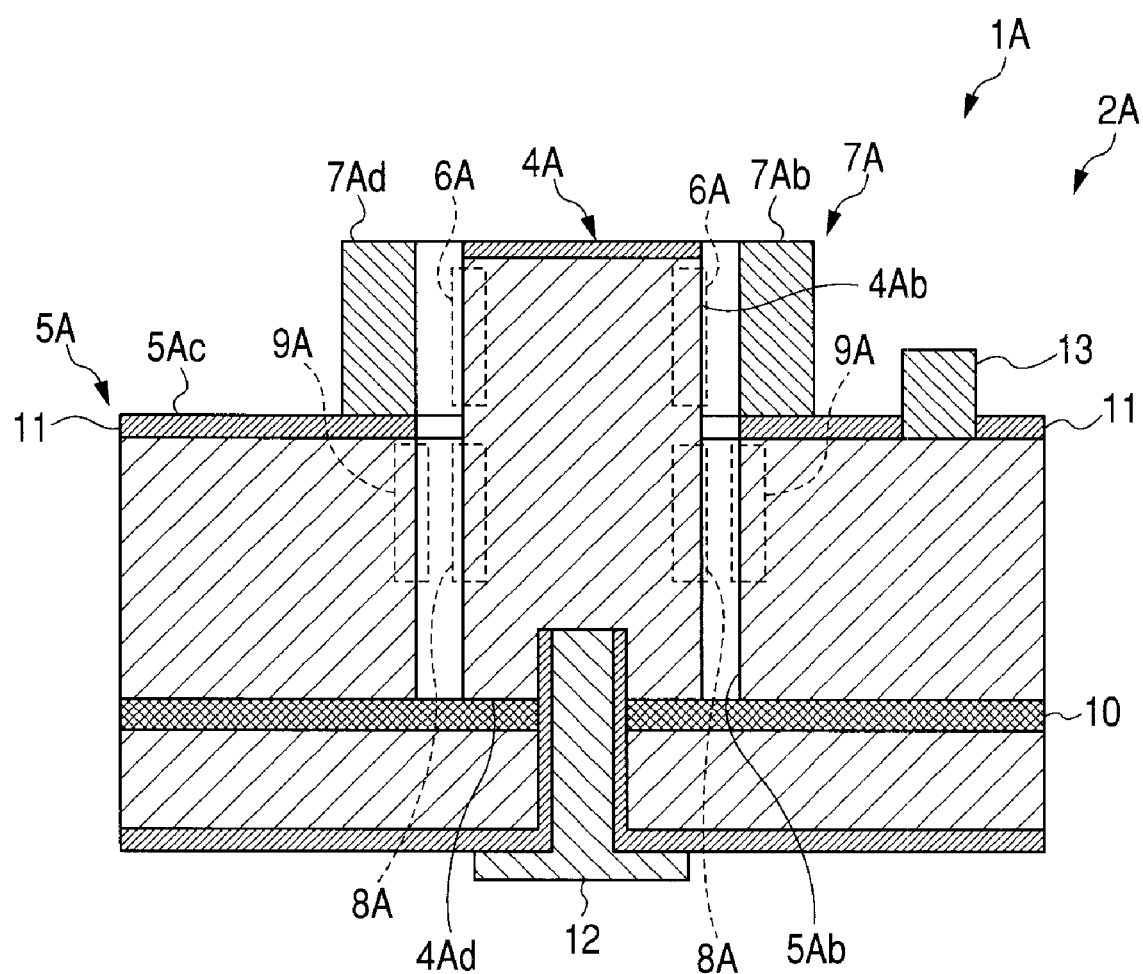
FIG. 2 is a cross-sectional view taken along the line II-II of FIG. 1.
Figure 3:
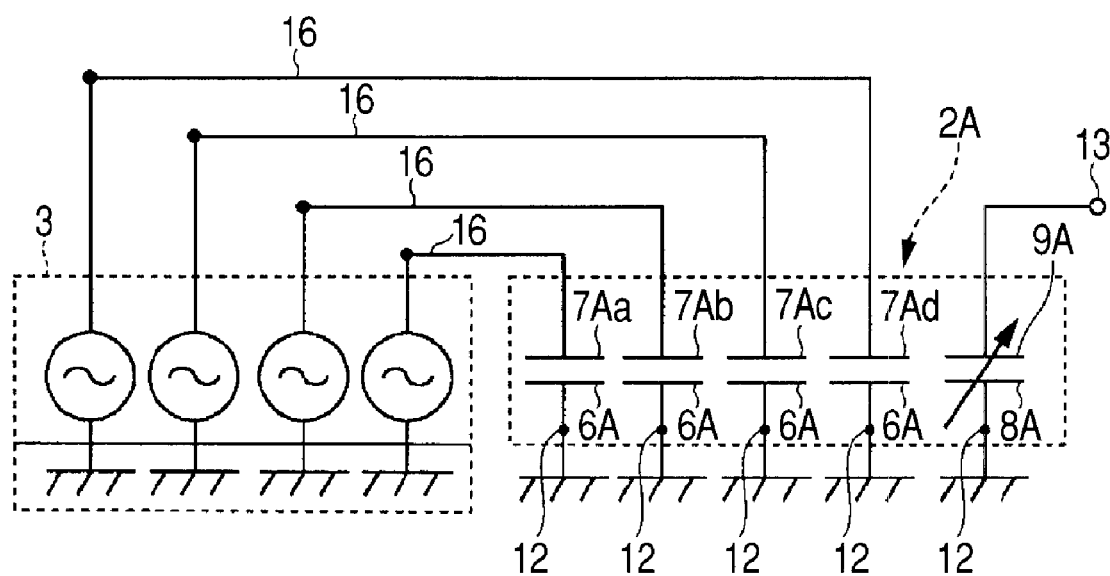
FIG. 3 is an equivalent circuit diagram illustrating the variable capacitance device according to the first embodiment.

First, a variable capacitance device 1A and a variable capacitance element 2A according to the first embodiment will be described with reference to FIGS. 1 to 5J. FIG. 1 is a plan view illustrating the variable capacitance element 2A according to the first embodiment, and FIG. 2 is a cross-sectional view taken along the line II-II of FIG. 1. In addition, FIG. 3 is a view illustrating an equivalent circuit of the variable capacitance device 1A according to the first embodiment.

The variable capacitance device 1A according to the first embodiment includes the variable capacitance element 2A and an external power supply 3. In addition, as shown in FIGS. 1 and 2, the variable capacitance element 2A includes a columnar vibrator 4A, a supporting wall 5A, a first driving electrode 6A, a second driving electrode 7A (divided pieces are referred to as 7Aa, 7Ab, 7Ac, and 7Ad, respectively), a first capacitive electrode 8A, a second capacitive electrode 9A, and extended electrodes as constituent components.

The columnar vibrator 4A is formed in a cylindrical shape and stands upward from a surface (insulating surface) of an insulating layer 10, as shown in FIGS. 1 and 2. A single crystal silicon is selected as a material used for the columnar vibrator 4A from the point of view of how easily the columnar vibrator 4A can be formed and how precisely the columnar vibrator 4A can be formed. The columnar vibrator 4A is formed integrally with the insulating layer 10 using an insulator of an SOI (silicon on insulator).

As shown in FIGS. 1 and 2, the supporting wall 5A is a wall-like member formed to have a cylindrical hole 5Aa with a larger diameter than that of the columnar vibrator 4A. The supporting wall 5A stands up from the surface of the insulating layer 10 such that the columnar vibrator 4A is surrounded in a cylindrical shape by the cylindrical hole 5Aa. In addition, the supporting wall 5A has an insulating surface layer 11, which is formed on a top surface thereof by oxidation, in order to support the second driving electrode 7A divided into a plurality of parts while maintaining an insulation property. Here, a single crystal silicon is selected as a material used for the supporting wall 5A from the point of view of how easily the supporting wall 5A can be formed and how precisely the supporting wall 5A can be formed. The supporting wall 5A is formed integrally with the insulating layer 10 using an insulator of an SOI.

As shown in FIG. 2, a pair of driving electrodes 6A and 7A including the first driving electrode 6A and the second driving electrode 7A are disposed such that the inner first driving electrode 6A is disposed on the upper periphery of an outer side surface 4Ab of the columnar vibrator 4A and the outer second driving electrode 7A having a ring shape is disposed on an upper end surface 5Ac of the supporting wall 5A. The pair of driving electrodes 6A and 7A are disposed opposite each other at predetermined distances therebetween. In addition, a pair of capacitive electrodes 8A and 9A including the first capacitive electrode 8A and the second capacitive electrode 9A are disposed such that the inner first capacitive electrode 8A is disposed on the middle periphery of the columnar vibrator 4A in the height direction thereof and the outer second capacitive electrode 9A having a ring shape is disposed on an inner side surface 5Ab of the supporting wall 5A. The pair of capacitive electrodes 8A and 9A are disposed opposite each other below the pair of driving electrodes 6A and 7A at predetermined distances therebetween.

Here, a first pair of electrodes 6A and 8A including the first driving electrode 6A and the first capacitive electrode 8A are formed in a closed circular ring shape (correctly speaking, the first driving electrode 6A and the first capacitive electrode 8A have imaginary closed circular ring shapes since the first driving electrode 6A and the first capacitive electrode 8A are formed integrally with the columnar vibrator 4A as will be described later) using a single crystal silicon having a property of a semiconductor, as shown in FIGS. 1 and 2. The pair of electrodes 6A and 8A are disposed on the periphery of an imaginary circular ring (refer to a circular ring R6 shown by a dotted line in FIG. 1), which surrounds the columnar vibrator 4A, on the outer side surface 4Ab of the columnar vibrator 4A. As is apparent from FIG. 2, the first pair of electrodes 6A and 8A are formed integrally with the columnar vibrator 4A that is formed using a single crystal silicon and are supported as a surface layer on the outer side surface 4Ab of the columnar vibrator 4A. Accordingly, existence of the first pair of electrodes 6A and 8A cannot be distinguished from the columnar vibrator 4A by appearance of the columnar vibrator 4A. In addition, the first pair of electrodes 6A and 8A are grounded through a first extended electrode 12 that extends downward from a base 4Ad of the columnar vibrator 4A passing through the insulating layer 10.

The second driving electrode 7A is formed in a ring shape so as to be divided into four equal parts by using a metal having good conductivity, such as Cu and Au, as shown in FIGS. 1 and 2. The second driving electrode 7A is disposed on the periphery of an imaginary circular ring (refer to a circular ring R7 shown by a dotted line in FIG. 1), which surrounds the columnar vibrator 4A, on the upper end surface 5Ac of the supporting wall 5A. As shown in FIG. 1, the ring-shaped second driving electrode 7A that is divided is formed such that ends of the parts 7Aa to 7Ad of the second driving electrode 7A in the circumferential direction thereof are close to each other as much as possible. In addition, the second driving electrode 7A is separately connected to the external power supply 3 using a conductive wire 16, as shown in FIG. 1.

The second capacitive electrode 9A is formed in a closed ring shape (correctly speaking, the second capacitive electrode 9A has an imaginary closed ring shape since the second capacitive electrode 9A is formed integrally with the supporting wall 5A as will be described later) using a single crystal silicon having a property of a semiconductor, as shown in FIGS. 1 and 2. The second capacitive electrode 9A is disposed on the periphery of an imaginary circular ring, which surrounds the columnar vibrator 4A, on the inner side surface 5Ab of the supporting wall 5A. As is apparent from FIG. 2, the second capacitive electrode 9A is formed integrally with the supporting wall 5A that is formed using the same material as the second capacitive electrode 9A and is supported as a surface layer on the inner side surface 5Ab of the supporting wall 5A. Accordingly, by appearance of the supporting wall 5A, existence of the second driving electrode 7A can be confirmed but existence of the second capacitive electrode 9A cannot be distinguished from the supporting wall 5A. In addition, the second capacitive electrode 9A is connected to another circuit through a second extended electrode 13 that extends upward passing through the insulating surface layer 11 of the supporting wall 5A, as shown in FIGS. 1 and 2.

Figure 4A:
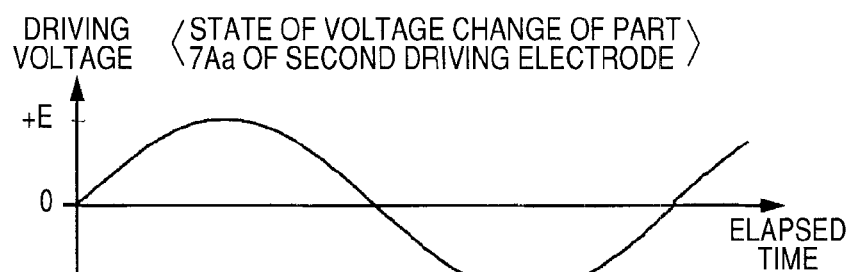
FIGS. 4A to 4D are graphs illustrating curves of driving voltages applied to parts of a second driving electrode divided into four equal parts, each of the driving voltages having a sinusoidal wave and a phase difference between the driving voltages being 90° in the order of FIGS. 4A to 4D.
Figure 4B:
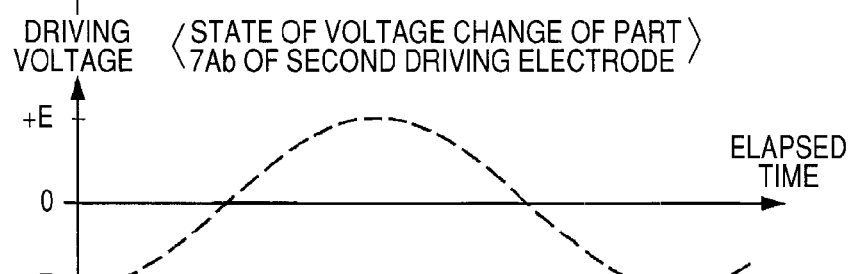
Figure 4C:
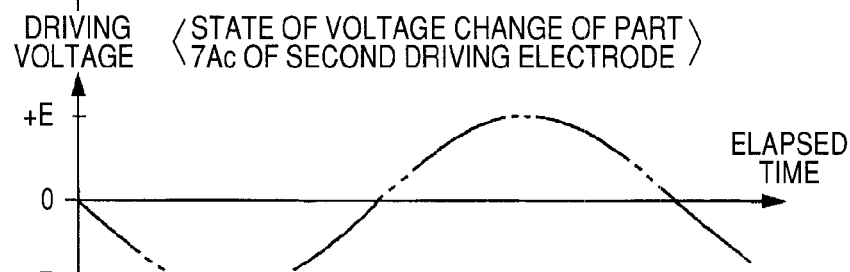
Figure 4D:
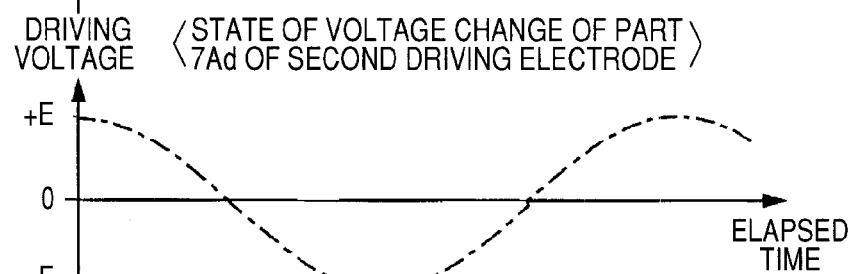
Figure 4E:
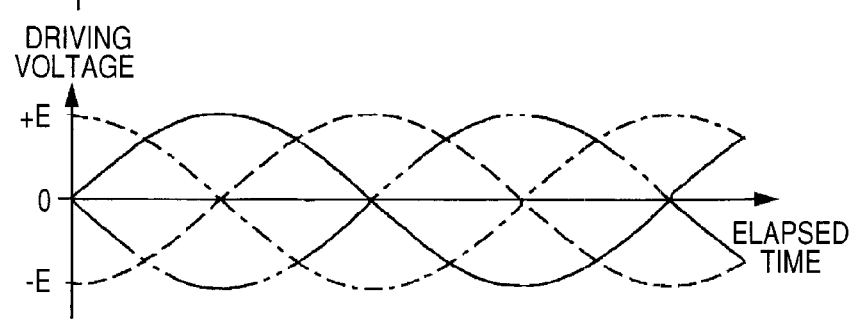
FIG. 4E is a graph obtained by overlapping curves of the driving voltages having sinusoidal waves shown in FIGS. 4A to 4D.

As shown in FIGS. 1 and 3, the external power supply 3 connected to the variable capacitance element 2A is connected to the second driving electrode 7A that is separately disposed, such that a driving voltage whose frequency is equal to a resonating frequency (also called the number of resonating rotations) of the columnar vibrator 4A is respectively applied to the second driving electrode 7A that is separately disposed. A state where the driving voltage is applied is shown in FIG. 4. FIGS. 4A to 4D are graphs illustrating a driving voltage applied to the second driving electrode 7A divided into four equal parts. FIG. 4E is a graph obtained by overlapping driving voltage curves shown in FIGS. 4A to 4D. As shown in FIG. 4E, the curve indicating the driving voltage is a sinusoidal wave. In addition, the phases of the driving voltage are different by 90° along the circumferential direction (in the order of the parts 7Aa, 7Ab, 7Ac, and 7Ad of the second driving electrode 7A or in the order of the parts 7Ad, 7Ac, 7Ab, and 7Aa of the second driving electrode 7A) of the second driving electrode 7A in accordance with an arrangement angle of the second driving electrode 7A that is divided into four equal parts (in the order of FIG. 4A, FIG. 4B, FIG. 4C, and FIG. 4D).

For example, in the first embodiment, the diameter of the columnar vibrator 4A is set to 50 μm and the height of the columnar vibrator 4A is 300 μm. Accordingly, in order to set a resonating frequency to 570 kHz, a frequency of a driving voltage is set to 570 kHz and is shifted by 1/(570×4) second (phase difference of 90°) in order to apply the driving voltage to the second driving electrode 7A, which is divided into four equal parts.

Next, a method of manufacturing the variable capacitance element 2A will be described with reference to FIGS. 5A to 5J. Here, FIGS. 5A to 5J are longitudinal sectional views illustrating processes of manufacturing the variable capacitance element 2A. In addition, the cut direction in FIGS. 5A to 5J is the same as that in FIG. 2.

The variable capacitance element 2A is manufactured in six processes from a 1A process to a 6A process, as shown in FIGS. 5A to 5J.

Figure 5A:
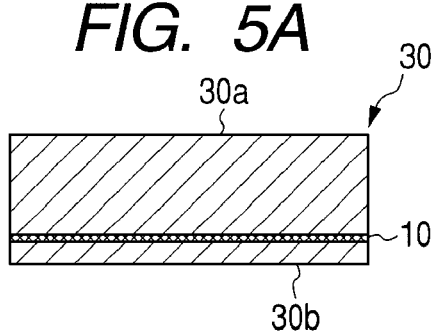
FIG. 5A is a longitudinal sectional view illustrating a process of manufacturing a variable capacitance element.
Figure 5F:
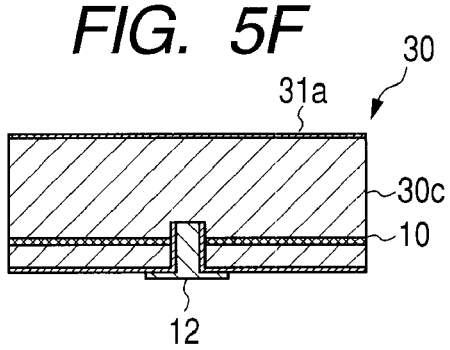
FIG. 5F is a longitudinal sectional view illustrating a process of manufacturing the variable capacitance element.
Figure 5B:
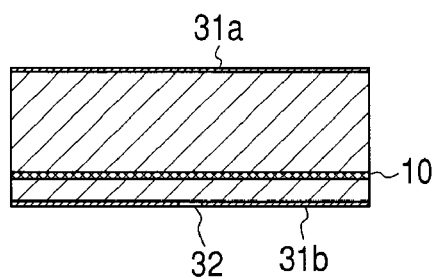
FIG. 5B is a longitudinal sectional view illustrating a process of manufacturing the variable capacitance element.

In the 1A process, insulating surface layers 31a and 31b shown in FIG. 5B are formed by oxidizing a top surface 30a and a bottom surface 30b of an SOI wafer 30 shown in FIG. 5A. In the case of the SOI wafer 30 used in the 1A process, the thickness of a lower layer is set to 50 μm, the thickness of an upper layer 30c is set to 300 μm, and the thickness of an insulator 10 interposed between the lower layer and the upper layer is set to 5 μm. Here, the insulator 10 of the SOI wafer 30 serves as the insulating layer 10 mentioned above. In addition, the thickness of each of the insulating surface layers 31a and 31b is set to 0.5 μm. In addition, after forming the insulating surface layers 31a and 31b, a part 32 of the insulating surface layer 31b on the bottom surface 30b side is etched in a circular shape using an RIE (reactive ion etching).

Figure 5G:
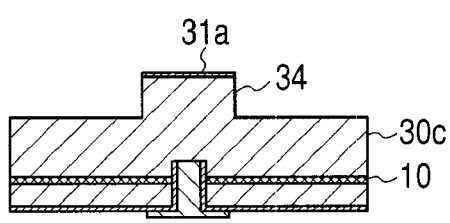
FIG. 5G is a longitudinal sectional view illustrating a process of manufacturing the variable capacitance element.
Figure 5C:
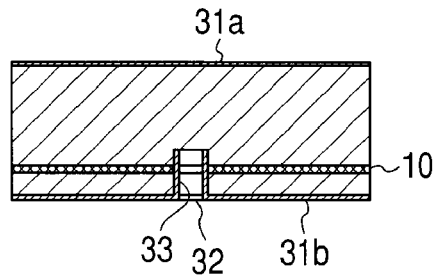
FIG. 5C is a longitudinal sectional view illustrating a process of manufacturing the variable capacitance element.
Figure 5H:
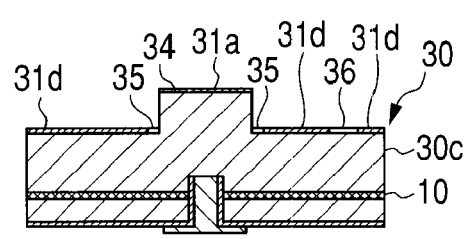
FIG. 5H is a longitudinal sectional view illustrating a process of manufacturing the variable capacitance element.
Figure 5D:
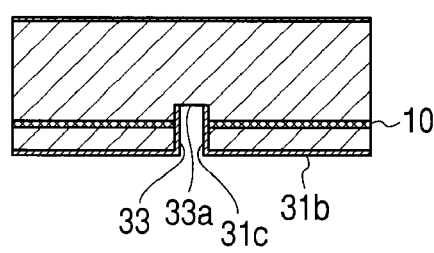
FIG. 5D is a longitudinal sectional view illustrating a process of manufacturing the variable capacitance element.

Then, in the 2A process, as shown in FIG. 5C, a cylindrical hole 33 is formed in the SOI wafer 30 from the part 32 of the insulating surface layer 31b, which has been etched in the 1A process, toward the inside of the SOI wafer 30 by using a Deep-RIE (deep etching performed in a direction perpendicular to a processed surface) based on a BOSCH process. Then, as shown in FIG. 5D, an oxide layer 31c is formed on an inner surface of the cylindrical hole 33. After forming the oxide layer 31c, only a bottom surface 33a of the cylindrical hole 33 formed with the oxide layer 31c is subject to the RIE such that an upper silicon 30c of the SOI wafer 30 is exposed to the outside, as shown in FIG. 5E.

Figure 5I:
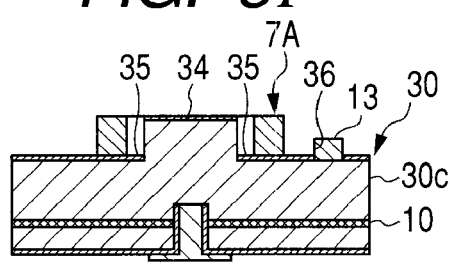
FIG. 5I is a longitudinal sectional view illustrating a process of manufacturing the variable capacitance element.
Figure 5E:
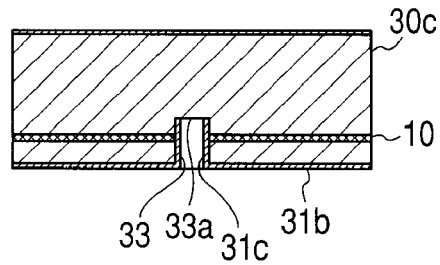
FIG. 5E is a longitudinal sectional view illustrating a process of manufacturing the variable capacitance element.

Thereafter, in the 3A process, a seed layer (not shown) formed by using a Ti layer with the thickness of 15 nm and a seed layer (not shown) formed by using a Cu layer with the thickness of 100 nm are formed on a surface of the insulating surface layer 31b on the bottom surface 30b and a surface of the oxide layer 31c of the cylindrical hole 33, respectively, by using a sputtering method, as shown in FIG. 5E. Then, a resist film (not shown) is formed on a surface of the seed layer and resist patterning is performed in a predetermined shape, and then a metal having good conductivity, such as Cu or Au, is electroplated on the seed layer exposed by the resist patterning. As a result, a first extended electrode 12, which has a shape of a circular rivet and has a shaft diameter of about 20 μm, is formed as shown in FIG. 5F. After the electroplating is completed, the resist film is removed by using a resist remover, and at the same time, the seed layer that is exposed on a surface by removing of the resist film is removed by ion milling.

Then, in the 4A process, a cylindrical projection 34 shown in FIG. 5G is formed by patterning a resist film (not shown), which has a diameter of 50 μm and has a circular shape, on the surface of the insulating surface layer 31a on the surface 30a side and then etching the resist film by about 100 μm using the Deep-RIE. The cylindrical projection 34 has the first extended electrode 12 formed on the bottom surface 30b side as a central axis. Then, after forming the cylindrical projection 34, a surface of the etched portion is oxidized to form an oxide layer 31d on the surface, as shown in FIG. 5H. After forming the oxide layer 31d, a circular ring groove 35 having a width of about 5 μm is patterned in a base periphery of the cylindrical projection 34 on the surface of the oxide layer 31d by using the RIE, and at the same time, a circular groove is patterned on a part (right side of FIG. 5H in the first embodiment) 36 outside the circular ring groove 35 by using the RIE, as shown in FIG. 5H.

In the 5A process, a seed layer (not shown) and a resist film (not shown) are sequentially formed on the surface of the oxide layer 31d formed in the 4A process and the surface exposed from the oxide layer 31d by etching, predetermined patterning is performed on the resist film, and then a metal having good conductivity, such as Cu and Au, is electroplated on the seed layer exposed from the resist film. As a result, the circular second driving electrode 7A that is opened to be divided into four equal parts and the cylindrical second extended electrode 13 used for the second capacitive electrode 9A are formed as shown in FIGS. 1 and 5I. After forming the second driving electrode 7A and the second extended electrode 13, the resist film is removed by using a resist remover and the seed film is removed by ion milling.

Figure 5J:
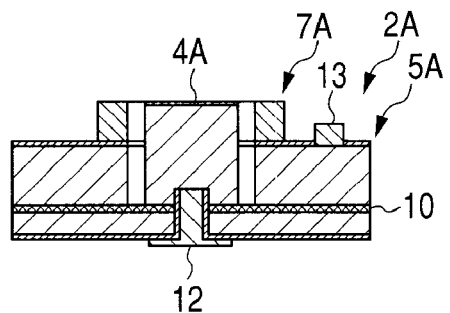
FIG. 5J is a longitudinal sectional view illustrating a process of manufacturing the variable capacitance element.

Then, in the 6A process, as shown in FIG. 5J, a portion other than the circular ring groove 35 that is interposed between the cylindrical projection 34 and the second driving electrode 7A and is formed in the 3A process is coated with a resist film and, and then the circular ring groove 35 is etched up to the insulating layer 10 by using the Deep-RIE such that cylindrical projection 34 becomes the cylindrical columnar vibrator 4A. After the etching is completed, the resist film formed on the portion other than the circular ring groove 35 is removed by using a resist remover. Finally, conductive wire 16 connected to the external power supply 3 is connected to each of the parts 7Aa to 7Ad of the second driving electrode 7A as shown in FIG. 1, and thus a process of manufacturing the variable capacitance element 2A is completed.

Figure 6:
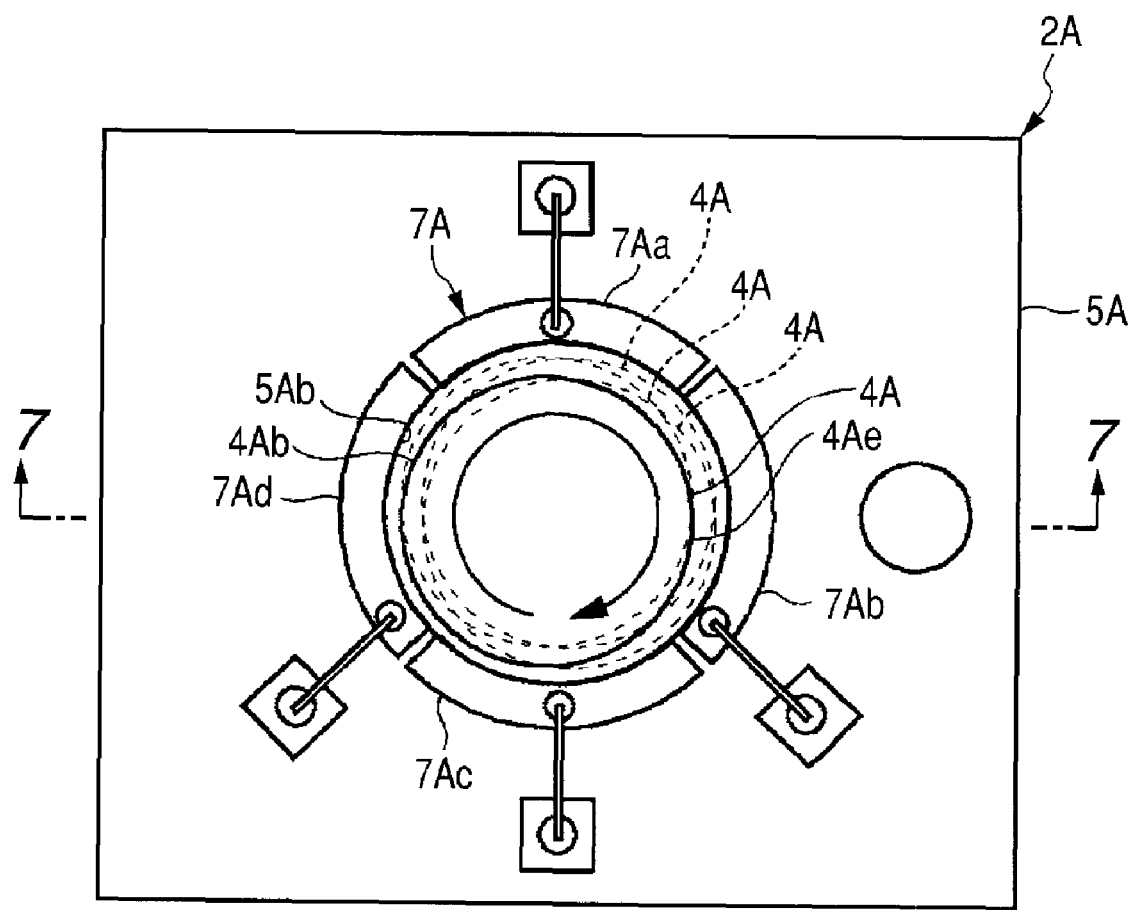
FIG. 6 is a plan view illustrating an operation state of the variable capacitance element according to the first embodiment.
Figure 7:
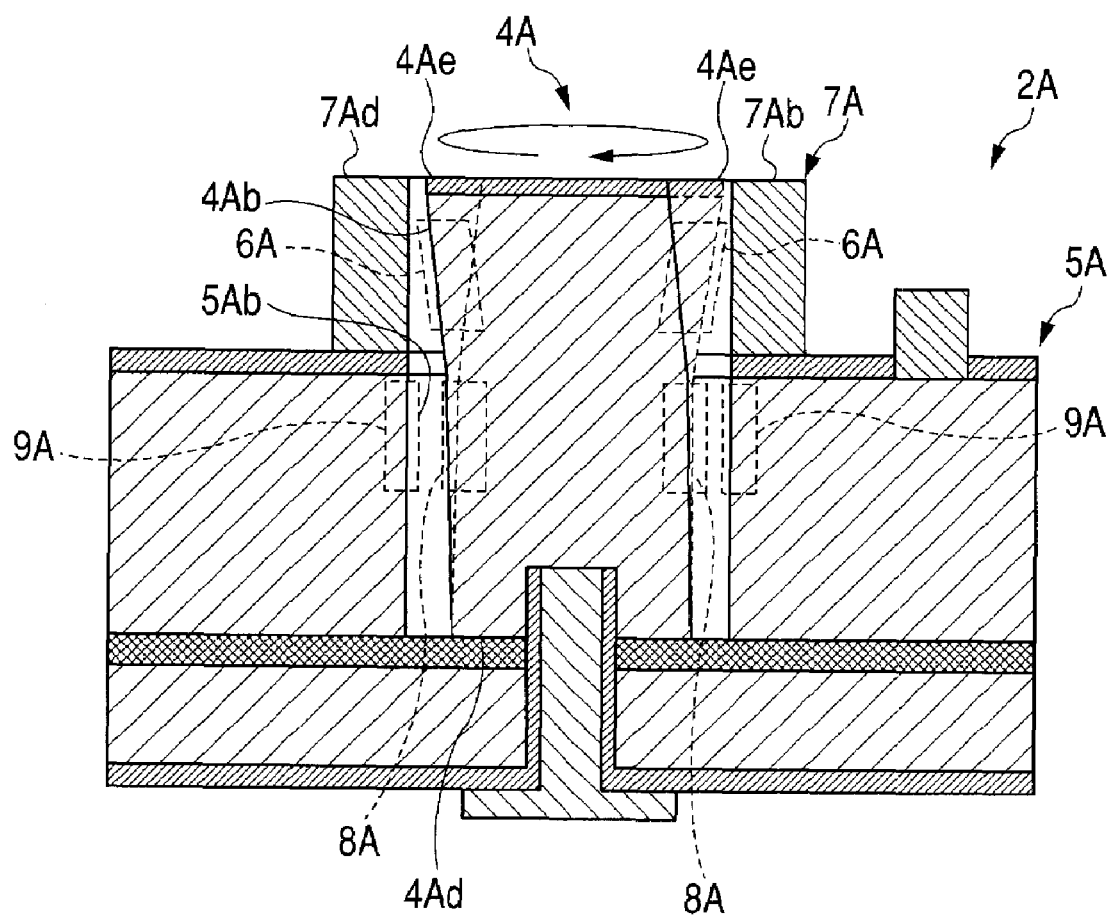
FIG. 7 is a cross-sectional view taken along the line VII-VII of FIG. 6.

Next, the variable capacitance device 1A and the variable capacitance element 2A according to the first embodiment will be described with reference to FIGS. 2 to 4E and FIGS. 6 to 8E. FIG. 6 is a plan view illustrating an operation state of the variable capacitance element 2A according to the first embodiment, and FIG. 7 is a cross-sectional view illustrating an operation state of the variable capacitance element 2A according to the first embodiment. FIGS. 8A to 8E are graphs illustrating a case in which a driving voltage applied to each of the parts 7Aa to 7Ad of the second driving electrode 7A, which are separately arranged, is changed in the shape of a square wave in the same manner as in FIGS. 4A to 4E.

The variable capacitance device 1A according to the first embodiment includes the variable capacitance element 2A and the external power supply 3, as shown in FIG. 3. As shown in FIGS. 4A to 4D, four driving voltages whose phases are sequentially shifted by 90° and each of which has a sinusoidal wave are sequentially applied from the external power supply 3 to the parts 7Aa to 7Ad of the second driving electrode 7A, which is divided into four equal parts, in the circumferential direction thereof, and as a result, a driving voltage between the first driving electrode 6A and the second driving electrode 7A sequentially increases in the circumferential direction of the second driving electrode 7A that is divided. For this reason, a attracting force (hereinafter, referred to as an 'electrostatic force') based on an electrostatic force generated between the first driving electrode 6A and the second driving electrode 7A increases or decreases in the order in the circumferential direction of the second driving electrode 7A.

Here, as shown in FIG. 2, the first driving electrode 6A is disposed above the outer side surface 4Ab of the columnar vibrator 4A (correctly speaking, the first driving electrode 6A is formed integrally with the columnar vibrator 4A, that is, imaginarily disposed). In addition, the second driving electrode 7A is disposed on the upper end surface 5Ac of the supporting wall 5A. Thus, when the increase or decrease in the electrostatic force sequentially occurs in the circumferential direction of the second driving electrode 7A, a front end 4Ae of the columnar vibrator 4A is rotated in the circumferential direction of the second driving electrode 7A while being bent toward a side where the second driving electrode 7A is disposed by using the base 4Ad of the columnar vibrator 4A as a fixed end, as shown in FIGS. 6 and 7. In addition, the first capacitive electrode 8A is disposed below the first driving electrode 6A (correctly speaking, the first capacitive electrode 8A is formed integrally with the columnar vibrator 4A, that is, imaginarily disposed) and the second capacitive electrode 9A is disposed below the second driving electrode 7A (correctly speaking, the second capacitive electrode 9A is formed integrally with the supporting wall 5A, that is, imaginarily disposed). Accordingly, as the columnar vibrator 4A is rotated, an opposite distance between the first capacitive electrode 8A and the second capacitive electrode 9A is decreased. As a result, the electrostatic capacitance between the first capacitive electrode 8A and the second capacitive electrode 9A is increased.

In addition, the rotation radius of the columnar vibrator 4A is proportional to the maximum intensity of an electrostatic force, that is, a maximum driving voltage. Accordingly, by totally increasing or decreasing the maximum driving voltage, it becomes possible to freely change the opposite distance between the first capacitive electrode 8A and the second capacitive electrode 9A. As described above, it is possible to easily change the electrostatic capacitance between the first capacitive electrode 8A and the second capacitive electrode 9A to a desired capacitance.

In the first embodiment, particularly important points of operations of the variable capacitance device 1A and the variable capacitance element 2A are that the variable capacitance device 1A and the variable capacitance element 2A cause the columnar vibrator 4A to vibrate by rotating the columnar vibrator 4A. As for a vibration frequency (or the number of rotations) of the columnar vibrator 4A, the number of rotations that allows rotation to be performed without requiring a large driving force, that is, a resonating frequency (the number of resonating rotations) exists. By applying a driving voltage, which has the same frequency as the resonating frequency of the columnar vibrator 4A, to the second driving electrode 7A, it is possible to rotate the columnar vibrator 4A with a driving voltage smaller than a driving voltage (driving voltage required in a known variable capacitance element) required only for causing the front end 4Ae of the columnar vibrator 4A to be bent toward the side where the second driving electrode 7A is disposed. That is, since it is possible to increase the amount of displacement of the columnar vibrator 4A without applying a large driving voltage by using resonance for the rotation of the columnar vibrator 4A, the electrostatic capacitance can be obtained with a small driving voltage.

In addition, as shown in FIG. 4, the external power supply 3 connected to the variable capacitance element 2A applies a driving voltage having a sinusoidal wave to the parts 7Aa to 7Ad of the second driving electrode 7A, which are separately disposed, while shifting a phase of the driving voltage sequentially in the circumferential direction of the second driving electrode 7A. Here, assuming that the external power supply 3 applies a driving voltage having a square wave shown in FIGS. 8A to 8E to the parts 7Aa to 7Ad of the divided second driving electrode 7A sequentially in the circumferential direction of the second driving electrode 7A, a change in electrostatic force occurs abruptly like an ON/OFF operation in the same manner as a waveform of a driving voltage. Accordingly, the columnar vibrator 4A does not make an ideal circular movement, but makes a rotational movement on the periphery of a square (polygon having the same corners as the number of division of the second driving electrode 7A). For this reason, when a driving voltage having a square wave is applied to the second driving electrode 7A, it becomes difficult to perform rotation of the columnar vibrator 4A while maintaining the opposite distance between the first capacitive electrode 8A and the second capacitive electrode 9A constant. That is, since an increase and decrease in the electrostatic force generated between the first driving electrode 6A and the second driving electrode 7A can be smoothly repeated by applying a driving voltage having a sinusoidal wave to the second driving electrode 7A, it is possible to smoothly rotate the columnar vibrator 4A as compared with the case in which the driving voltage having the square wave shown in FIG. 8 is applied.

Moreover, in the variable capacitance element 2A according to the first embodiment, it is necessary to rotate the columnar vibrator 4A while maintaining the opposite distance between the first capacitive electrode 8A and the second capacitive electrode 9A constant in order to obtain a desired electrostatic capacitance. Therefore, the variable capacitance element 2A according to the first embodiment is configured as follows.

As shown in FIG. 7, the second pair of electrodes 7A and 9A including the second driving electrode 7A and the second capacitive electrode 9A are disposed above and below the supporting wall 5A so as to be separated from each other. In addition, the first pair of electrodes 6A and 8A including the first driving electrode 6A and the first capacitive electrode 8A are disposed in the columnar vibrator 4A so as to correspond to the arrangement of the second pair of electrodes 7A and 9A (correctly speaking, the first driving electrode 6A and the first capacitive electrode 8A are imaginarily disposed above and below the first driving electrode 6A and the first capacitive electrode 8A since the first pair of electrodes 6A and 8A are formed integrally with the columnar vibrator 4A), the first capacitive electrode 8A and the second capacitive electrode 9A can be seamlessly formed in a closed ring shape. Thus, it is possible to prevent an opposite area between the first capacitive electrode 8A and the second capacitive electrode 9A from changing even if the rotation of the columnar vibrator 4A is performed. In this manner, the electrostatic capacitance between the first capacitive electrode 8A and the second capacitive electrode 9A can be maintained constant without being changed.

In addition, as shown in FIGS. 6 and 7, the columnar vibrator 4A which supports the first pair of electrodes 6A and 8A is formed in a cylindrical shape, and the supporting wall 5A which supports the second pair of electrodes 7A and 9A is formed to surround the cylindrical columnar vibrator 4A in a circular shape. Therefore, the opposite distance from the outer side surface 4Ab of the rotating columnar vibrator 4A to the inner side surface 5Ab of the supporting wall 5A is maintained constant unlike the time of rotation of the columnar vibrator 4A having a prismatic shape. Therefore, since the opposite distance between the first pair of electrodes 6A and 8A supported by the columnar vibrator 4A and the second pair of electrodes 7A and 9A supported by the supporting wall 5A can be maintained constant, it is possible to rotate the columnar vibrator 4A while making the columnar vibrator 4A closer to the supporting wall 5A side, as compared with a case in which the columnar vibrator formed in the prismatic form is made to rotate.

In this case, since the variable capacitance element 2A is used as an MEMS, the columnar vibrator 4A and the supporting wall 5A are very small. Accordingly, it is not easy to precisely form the columnar vibrator 4A and the supporting wall 5A. Therefore, in the variable capacitance element 2A according to the first embodiment, the columnar vibrator 4A having a circular shape that supports the first pair of electrodes 6A and 8A and the supporting wall 5A that supports the second pair of electrodes 7A and 9A can be precisely formed by etching a single crystal silicon in an SOI (silicon-on insulator) so as to form the columnar vibrator 4A and the supporting wall 5A. In such a manner, the opposite distance between electrodes can be precisely set.

In addition, as shown in FIG. 7, the first pair of electrodes 6A and 8A supported on the columnar vibrator 4A, that is, the first driving electrode 6A and the first capacitive electrode 8A are integrally formed using a single crystal silicon in the SOI, and at the same time, the first pair of electrodes 6A and 8A are formed integrally with the columnar vibrator 4A as a surface layer of the outer side surface 4Ab of the columnar vibrator 4A formed using the single crystal silicon. In addition, the first pair of electrodes 6A and 8A are grounded through the first extended electrode 12 that extends downward from the base 4Ad of the columnar vibrator 4A.

Since the first pair of electrodes 6A and 8A are grounded and integrally formed, an insulating layer such as an oxide layer or air does not need to be interposed between the first driving electrode 6A and the first capacitive electrode 8A, unlike a case in which the first pair of electrodes 6A and 8A are separately formed in a state where the first pair of electrodes 6A and 8A are spaced apart from each other. Accordingly, the first pair of electrodes 6A and 8A can be easily formed. In addition, by integrally forming the columnar vibrator 4A and the first pair of electrodes 6A and 8A using a single crystal silicon, the columnar vibrator 4A having a satisfactory formation precision can be used as the first driving electrode 6A and an first capacitive electrode 8A. As a result, it is possible to maintain the opposite distance between the first pair of electrodes 6A and 8A and the second pair of electrodes 7A and 9A accurate and constant, and it is possible to omit processes for separately forming the first driving electrode 6A and the first capacitive electrode 8A.

That is, in the variable capacitance device 1A and the variable capacitance element 2A according to the first embodiment, resonance can be used for the rotation of the columnar vibrator 4A regardless of the bent amount of the columnar vibrator 4A. Accordingly, a desired electrostatic capacitance can be obtained even if a driving voltage is small. As described above, the variable capacitance device 1A and the variable capacitance element 2A according to the first embodiment are advantageous in that a large electrostatic capacitance can be obtained with small power consumption.

Furthermore in the first embodiment, although the second driving electrode 7A is disposed to be divided into four equal parts as shown in FIG. 1 and FIG. 6, the second driving electrode 7A may be divided into three or more parts allowing the rotation of the columnar vibrator 4A. Alternatively, the second driving electrode 7A may be divided into a more number of equal parts, for example, six equal parts or eight equal parts in order to make the rotation of the columnar vibrator 4A more smooth.

Figure 9:
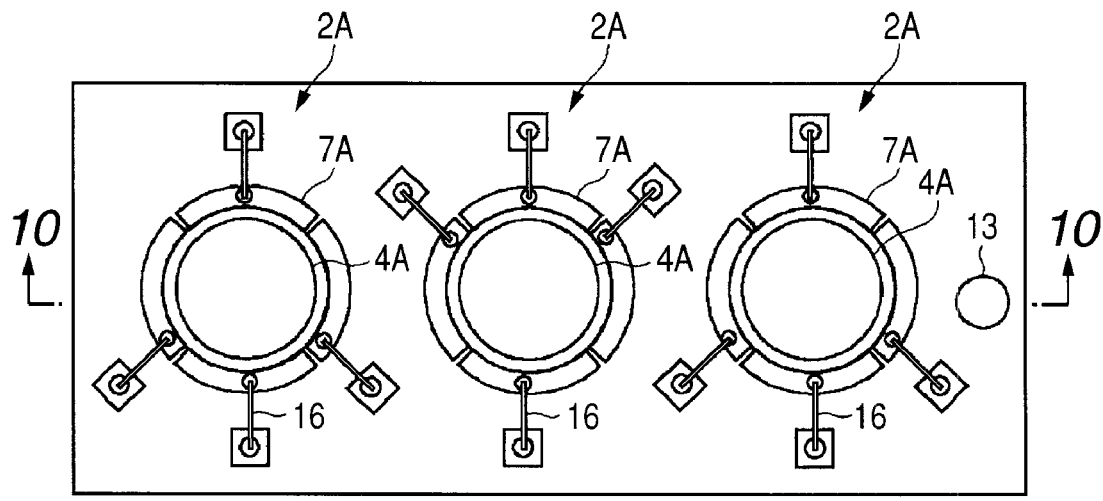
FIG. 9 is a plan view illustrating a case in which a plurality of variable capacitance elements according to the first embodiment are connected to each other.
Figure 10:
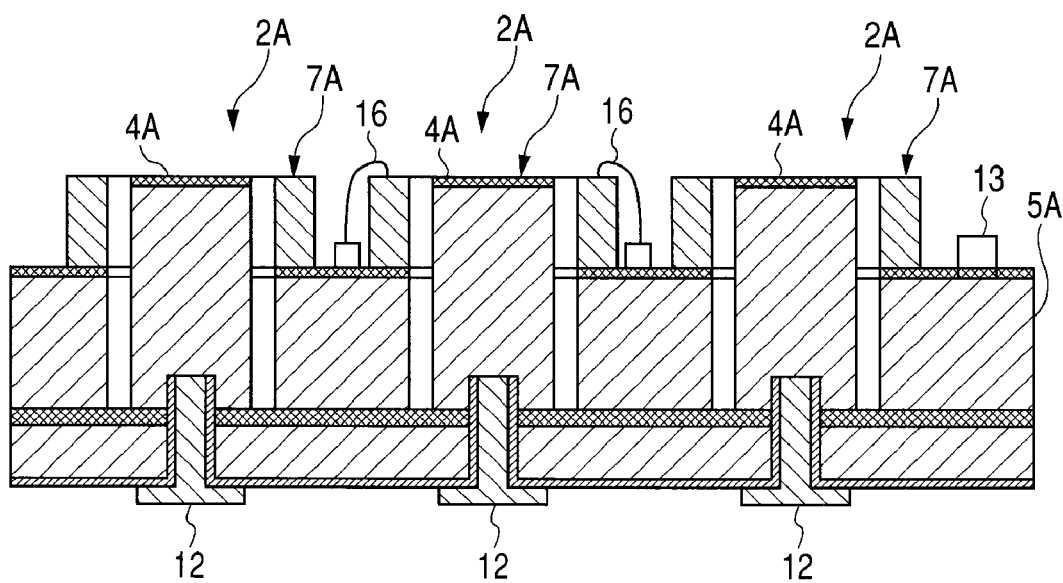
FIG. 10 is a cross-sectional view taken along the line X-X of FIG. 9.

In addition, in order to increase a value of electrostatic capacitance obtainable from the variable capacitance element 2A, a plurality of variable capacitance elements 2A can be formed to thereby obtain the electrostatic capacitance corresponding to the number of formed variable capacitance elements 2A, as shown in FIGS. 9 and 10.

Figure 11:
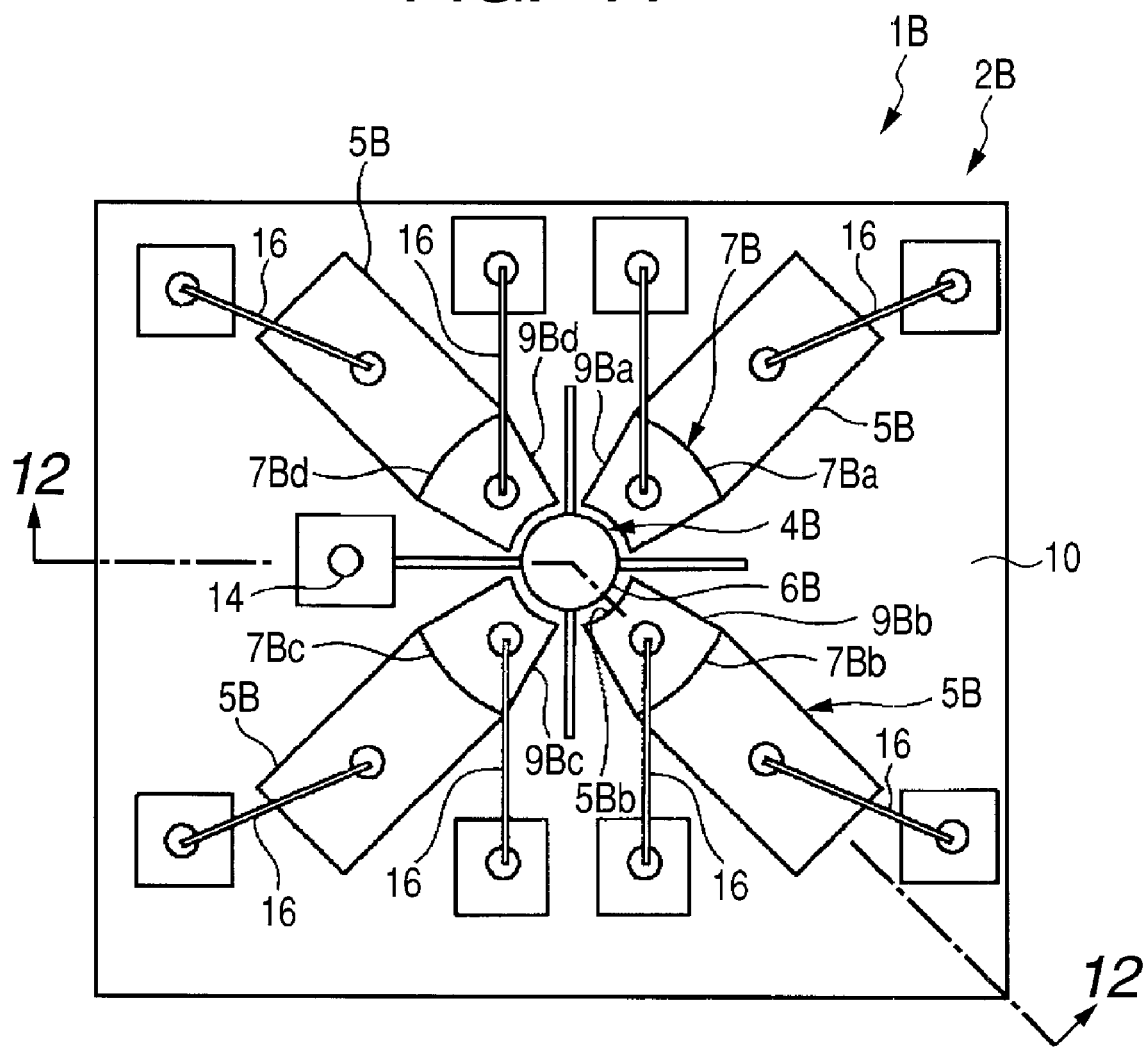
FIG. 11 is a plan view illustrating a variable capacitance element according to a second embodiment.
Figure 12:
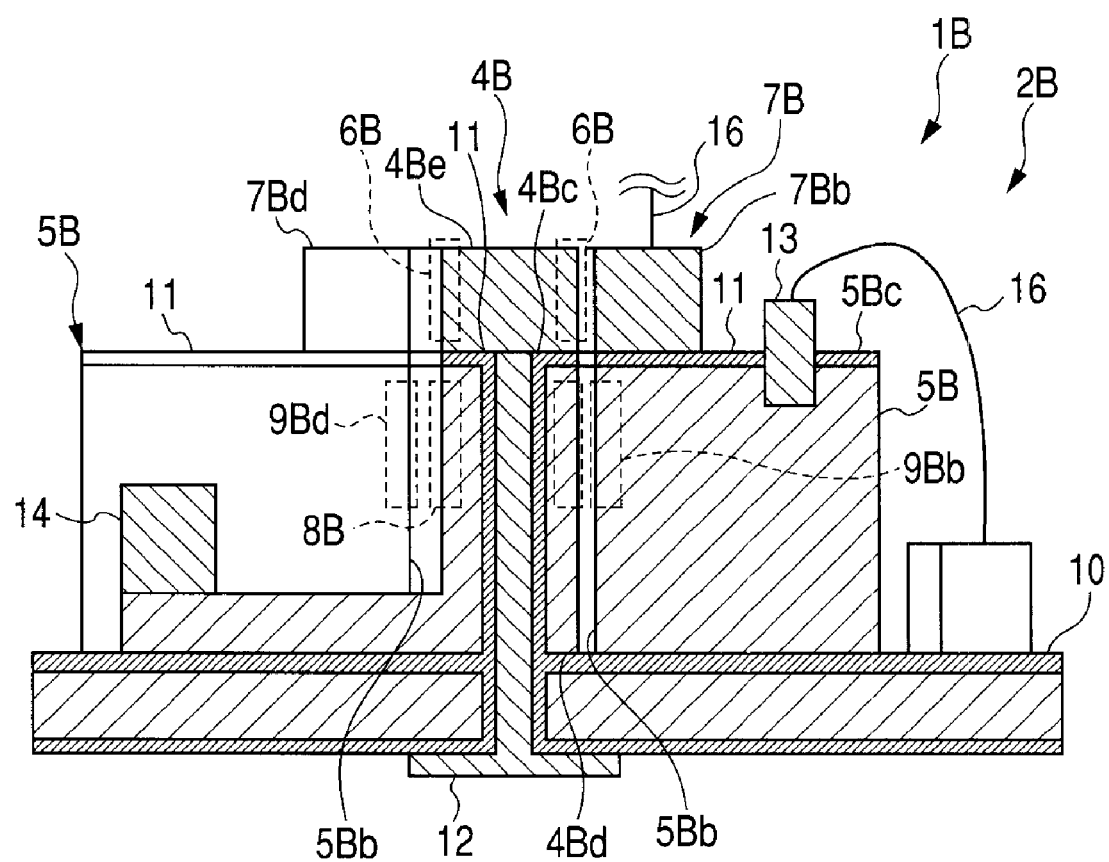
FIG. 12 is a cross-sectional view taken along the line XII-XII of FIG. 11.

Next, a variable capacitance device 1B and a variable capacitance element 2B according to a second embodiment will be described with reference to FIGS. 11 to 14. FIG. 11 is a plan view illustrating the variable capacitance element 2B according to the second embodiment, and FIG. 12 is a cross-sectional view taken along the line XII-XII of FIG. 11. In addition, FIG. 13 is a view illustrating an equivalent circuit of the variable capacitance device 1B according to the second embodiment.

Figure 13:
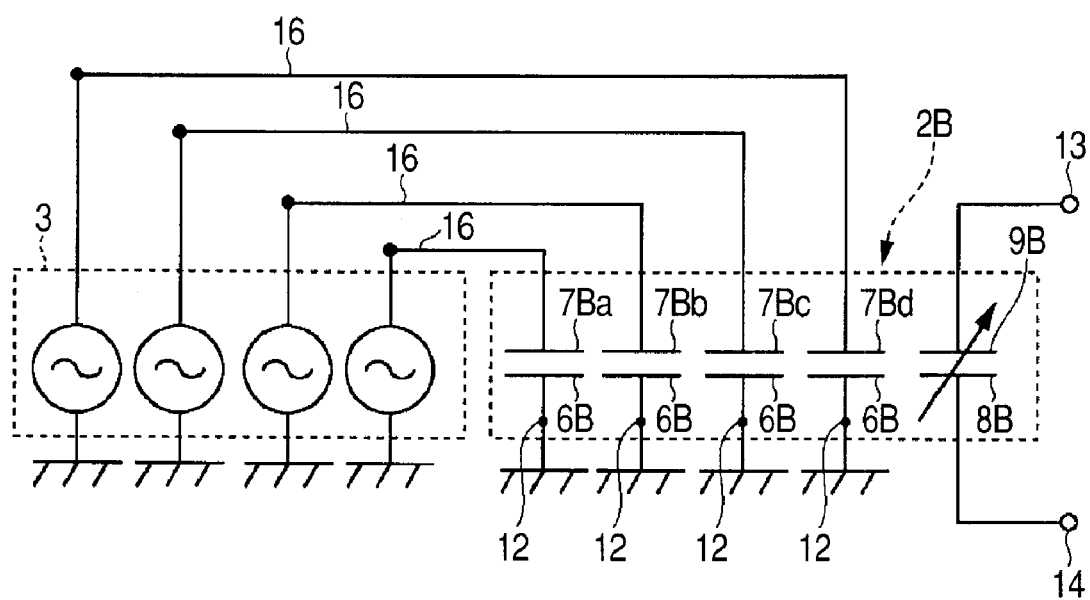
FIG. 13 is an equivalent circuit diagram illustrating the variable capacitance device according to the second embodiment.

The variable capacitance device 1B according to the second embodiment includes the variable capacitance element 2B, which is shown in FIGS. 11 and 12, and an external power supply 3 shown in FIG. 13, in the same manner as the variable capacitance device 1A according to the first embodiment. As shown in the equivalent circuit of FIG. 13, the variable capacitance device 1A according to the first embodiment is different from the variable capacitance device 1B according to the second embodiment in a point of the variable capacitance elements 2A and 2B. The variable capacitance element 2A according to the first embodiment is different from the variable capacitance element 2B according to the second embodiment according to whether or not the first capacitive electrode 8A or 8B is formed integrally with the first driving electrode 6A or 6B as shown in FIG. 12 and whether or not the first capacitive electrode 8A or 8B is grounded as shown in FIG. 13. Details of the variable capacitance element 2B according to the second embodiment will be described focusing on the different points.

As shown in FIGS. 11 and 12, the variable capacitance element 2B according to the second embodiment includes a columnar vibrator 4B, a supporting wall 5B, a first driving electrode 6B, a second driving electrode 7B, a first capacitive electrode 8B, a second capacitive electrode 9B, and extended electrodes (a first driving electrode 6B, a second driving electrode 7B, a first capacitive electrode 8B, and a second capacitive electrode 9B) for the electrodes.

As shown in FIGS. 11 and 12, the columnar vibrator 4B is formed in a cylindrical shape and stands upward from a surface (insulating surface) of an insulating layer 10, in the same manner as the columnar vibrator 4A in the first embodiment. In addition, the columnar vibrator 4B has an insulating surface layer 11, which is formed on a top surface thereof by oxidation, in order to support the first driving electrode 6B positioned above the columnar vibrator 4B while maintaining an insulation property. A material used for the columnar vibrator 4B is the same as that in the first embodiment and is formed integrally with the insulating layer 10.

As shown in FIGS. 11 and 12, the supporting wall 5B is a combination of four wall-like members obtained by disposing a three-dimensional member having a predetermined shape (three-dimensional shape obtained by combination of a deformed quadrangular column, which is located at an inner side of the three-dimensional member and of which a bottom shape is an isosceles trapezoid and a surface opposite the columnar vibrator is curved toward the inside, and a quadrangular column whose bottom shape is a rectangle) shown in FIG. 11, which has as a surface 5Bb opposite the columnar vibrator 4B a curved surface having a radius larger than that of the columnar vibrator 4B as a radius of curvature, equally in four directions. The supporting wall 5B stands up from a surface of the insulating layer 10 such that the columnar vibrator 4B is surrounded in the circular shape by the four curved surfaces.

In addition, the supporting wall 5B has an insulating surface layer 11, which is formed on a top surface thereof by oxidation, in order to support the second driving electrode 7B divided into a plurality of parts while maintaining an insulation property. Here, a single crystal silicon is selected as a material used for the supporting wall 5B from the point of view of how easily the supporting wall 5B can be formed and how precisely the supporting wall 5B can be formed. The supporting wall 5B is formed integrally with the insulating layer 10 using an SOI wafer 30. In addition, as shown in FIGS. 1 and 11, the shape of the supporting wall 5B in the second embodiment is largely different from that of the supporting wall 5A in the first embodiment, but there is no large difference in terms of an equivalent circuit as shown in FIGS. 3 and 13.

As shown in FIGS. 11 and 12, the pair of driving electrodes 6B and 7B are disposed opposite each other at predetermined distances therebetween on upper end surfaces 4Bc and 5Bc of the columnar vibrator 4B and the supporting wall 5B. In addition, below the pair of driving electrodes 6B and 7B, the pair of capacitive electrodes 8B and 9B are disposed opposite each other at predetermined distances therebetween on an outer side surface 4Bb of the columnar vibrator 4B and an inner side surface 5Bb of the supporting wall 5B. In addition, the opposite arrangement in the up and down direction is the same as in the first and second embodiments.

Here, as shown in FIGS. 11 and 12, the first driving electrode 6B stands up in a cylindrical shape from the upper end surface 4Bc of the cylindrical columnar vibrator 4B, such that the first driving electrode 6B is disposed to overlap the periphery of an imaginary circular ring positioned above the columnar vibrator 4B. In addition, the first driving electrode 6B is grounded through a first extended electrode 12 that extends downward from a base 4Bd of the columnar vibrator 4B passing through the insulating layer 10.

In the same manner as the first capacitive electrode 8A in the first embodiment, the first capacitive electrode 8B is formed in a closed circular ring shape (correctly speaking, imaginary closed ring shapes) using a single crystal silicon and is disposed on the periphery of an imaginary circular ring, which surrounds the columnar vibrator 4B, on the outer side surface 4Bb of the columnar vibrator 4B. As is apparent from FIG. 12, the first capacitive of electrode 8B is formed integrally with the columnar vibrator 4B that is formed using a single crystal silicon and is supported as a surface layer on the outer side surface 4Bb of the columnar vibrator 4B. Therefore, existence of the first capacitive electrode 8B cannot be checked by appearance of the columnar vibrator 4A. In addition, the first capacitive electrode 8B is connected to another circuit through a third extended electrode 14 that extends from the base 4Bd of the columnar vibrator 4B along a top surface of the insulating layer 10.

As shown in FIGS. 11 and 12, the second driving electrode 7B is disposed on the periphery of an imaginary circular ring, which surrounds the columnar vibrator 4B, on the upper end surface 5Bc of the supporting wall 5B. In addition, the second driving electrode 7B is formed using a metal having good conductivity, such as Cu and Au, in the shape in which four parts of four or more parts obtained by dividing a circular ring into four or more or parts are arranged at equal distances on the periphery of an imaginary circular ring in order to surround the columnar vibrator 4B. In addition, the second driving electrode 7B is separately connected to the external power supply 3 using a conductive wire 16, as shown in FIG. 11.

As shown in FIGS. 11 and 12, the second capacitive electrode 9B is formed using a single crystal silicon in the shape in which four parts 9Ba to 9Bd obtained by dividing a circular ring into four or more parts are arranged at equal distances on the periphery of an imaginary circular ring positioned below the first capacitive electrode 8B (correctly speaking, the shape of the second capacitive electrode 9B is an imaginary shape because the second capacitive electrode 9B is formed integrally with the supporting wall 5B as will be described later). As is apparent from FIG. 12, the second capacitive electrode 9B is formed integrally with the supporting wall 5B that is formed using the same material as the second capacitive electrode 9B and is supported as a surface layer on the inner side surface 5Bb of the supporting wall 5B. Therefore, existence of the second capacitive electrode 9B cannot be checked. In addition, the second capacitive electrode 9B is connected to another circuit through a second extended electrode 13 that extends upward passing through the insulating surface layer 11 of the supporting wall 5B, as shown in FIGS. 11 and 12.

In addition, the shapes of the second driving electrode 7B and the second capacitive electrode 9B described above are greatly different from the shapes of the second driving electrode 7A and the second capacitive electrode 9A, as shown in FIGS. 1, 2, 11, and 12. However, in terms of the equivalent circuits shown in FIGS. 3 and 13, the second driving electrodes 7A and 7B in the first and second embodiments are equal to each other and the second capacitive electrodes 9A and 9B in the first and second embodiments are equal to each other.

As shown in FIGS. 3 and 13, the external power supply 3 connected to the variable capacitance element 2B is connected to the second driving electrode 7B that is divided, in the same manner as the external power supply 3 in the first embodiment. The intensity, a frequency, and a phase difference of a driving voltage supplied from the external power supply 3 are decided in consideration of characteristics related to the control of rotation of the columnar vibrator 4B, such as the size of the columnar vibrator 4B, the opposite distance between electrodes, and an electrostatic force generated in a driving electrode. For example, since the second driving electrode 7B is divided into four parts, the columnar vibrator 4B is rotated by changing a phase difference of a driving voltage by 90°.

Next, a method of manufacturing the variable capacitance element 2B according to the second embodiment will be described with reference to FIGS. Here, FIGS. 14A to 14F are longitudinal sectional views illustrating processes for manufacturing the variable capacitance element 2B in the order FIGS. 14A to 14F. In addition, the cut direction in FIGS. 14A to 14F is the same as that in FIG. 12.

The variable capacitance element 2B is manufactured in six processes from a 1B process to a 6B process, as shown in FIGS. 14A to 14F.

Figure 14A:
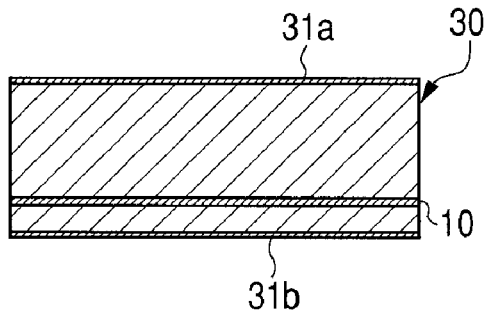
FIG. 14A is a view illustrating a process of manufacturing the variable capacitance device according to the second embodiment.

In the 1B process, insulation surface layers 31a and 31b are formed by oxidizing a top surface 30a and a bottom surface 30b of the SOI wafer 30, as shown in FIG. 14A. The same wafer as in the 1A process in the first embodiment is used as the SOI wafer 30. Here, an insulator 10 of the SOI wafer 30 serves as the insulating layer 10 mentioned above. In addition, the thickness of each of the insulating surface layers 31a and 31b is set to 0.5 µm.

Figure 14D:
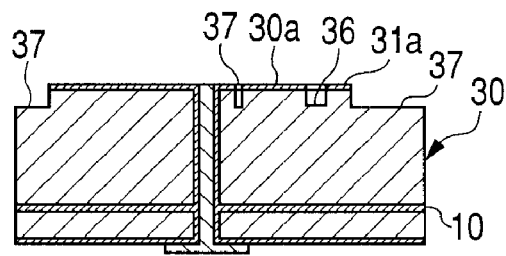
FIG. 14D is a view illustrating a process of manufacturing the variable capacitance device according to the second embodiment.
Figure 14B:
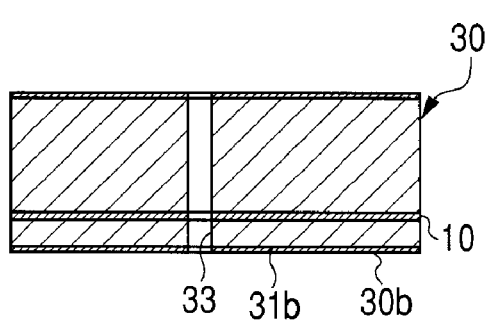
FIG. 14B is a view illustrating a process of manufacturing the variable capacitance device according to the second embodiment.

In the 2B process, as shown in FIG. 14B, a cylindrical hole 33 is formed in the SOI wafer 30 by using the Deep-RIE based on the BOSCH process.

Figure 14E:
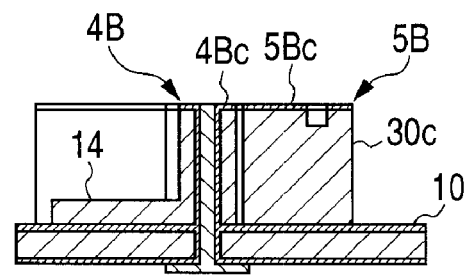
FIG. 14E is a view illustrating a process of manufacturing the variable capacitance device according to the second embodiment.
Figure 14C:
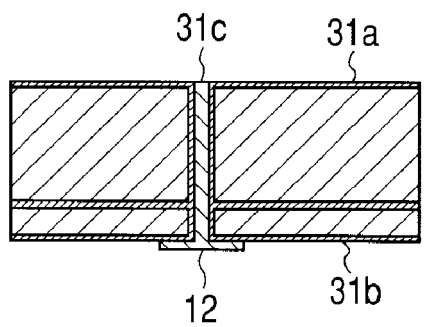
FIG. 14C is a view illustrating a process of manufacturing the variable capacitance device according to the second embodiment.

Then, in the 3B process, an oxide layer 31c is formed on an inner surface of the cylindrical hole 33 formed in the 2B process and then a seed layer (not shown), which is formed by using a Ti layer with the thickness of 15 nm and a Cu layer with the thickness of 100 nm, are formed on a surface of the insulating surface layer 31b on the bottom surface 30b and a surface of the oxide layer 31c of the cylindrical hole 33, as shown in FIG. 14C. Then, a resist film (not shown) is formed on a surface of the seed layer and resist patterning is performed in a predetermined shape, and then a metal having good conductivity, such as Cu or Au, is electroplated on the seed layer exposed by the resist patterning. As a result, a first extended electrode 12, which has a shape of a circular rivet and has a shaft diameter of about 20 µm, is formed as shown in FIG. 14C. After the electroplating is completed, the resist film is removed by using a resist remover, and at the same time, the seed layer that is exposed on a surface by removing of the resist film is removed by ion milling.

In the 4B process, as shown in FIG. 14D, a portion 37 (see FIGS. 11 and 14E) through which the insulator 10 of the SOI wafer 30 needs to be exposed from the insulating surface layer 31a on the surface 30a side and a portion 36 where the second extended electrode 13 is formed are etched by about 20 µm by performing predetermined resist patterning (not shown) on portions other than the portion 37, through which the insulator 10 of the SOI wafer 30 is exposed from the insulating surface layer 31a on the surface 30a side in the subsequent 5B process, and the portion 36 where the second extended electrode 13 is formed and then performing the Deep-RIE. After completing the etching, an unnecessary resist film is removed using a resist remover.

In the 5B processes, a resist film is formed on portions corresponding to the upper end surfaces 4Bc and 5Bc of the columnar vibrator 4B and the supporting wall 5B by means of resist patterning and a portion that is not patterned is etched using the Deep-RI. By this etching, the columnar vibrator 4B (including the first capacitive electrode 8B), the supporting wall 5B (including the second capacitive electrode 9B), and the third extended electrode 14 are formed using an upper silicon 30c of the SOI wafer 30, as shown in FIGS. 11 and 14E. Then, an unnecessary resist film is removed using a resist remover after completing the etching.

Figure 14F:
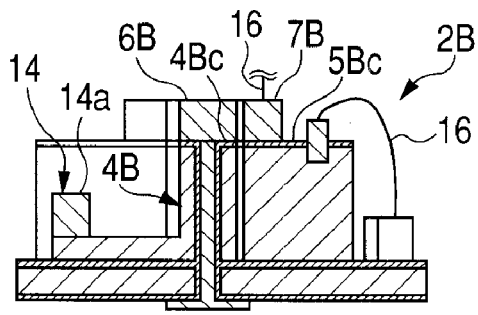
FIG. 14F is a view illustrating a process of manufacturing the variable capacitance device according to the second embodiment.

In the 6B processes, as shown in FIG. 14F, a seed layer (not shown) and a resist film (not shown) are sequentially formed on the upper end surfaces 4Bc and 5Bc of the columnar vibrator 4B and the supporting wall 5B, predetermined patterning is performed on the resist film, and then a metal having good conductivity, such as Cu or Au, is electroplated on the seed layer exposed from the resist film. As a result, the first driving electrode 6B having a cylindrical shape, the second driving electrode 7B that is divided, and a terminal 14a formed in ends of the second extended electrode 13 and the third extended electrode 14 connected to the second capacitive electrode 9B are formed, as shown in FIGS. 11 and 14C. Then, the resist film is removed using a resist remover and the seed layer is removed by ion milling and the conductive wire 16 connected to the external power supply 3 is connected to the second driving electrode 7B as shown in FIG. 14F, and thus the processes for manufacturing the variable capacitance element 2B is completed.

Next, operations of the variable capacitance device 1B and the variable capacitance element 2B according to the second embodiment will be described with reference to FIGS. 11 to 13.

The variable capacitance device 1B according to the second embodiment includes the variable capacitance element 2B and the external power supply 13, as shown in FIG. 13. In the same manner as in the first embodiment, when four driving voltages (see FIGS. 4A to 4E) having a sinusoidal wave and a phase difference of 90° are sequentially applied from the external power supply 3 to the divided parts 7Ba to 7Bd of the second driving electrode 7B in the circumferential direction thereof, a driving voltage between the first driving electrode 6B and the second driving electrode 7B sequentially increases or decreases in the circumferential direction (direction of the part 7Ba->part 7Bb->part 7Bc->part 7Bd or an opposite direction) of the second driving electrode 7B. As a result, an electrostatic force sequentially increases or decreases in the circumferential direction of the second driving electrode 7B. Since the increase or decrease in electrostatic force occurs in the circumferential direction of the second driving electrode 7B, a front end 4Be of the columnar vibrator 4B is rotated in the circumferential direction of the second driving electrode 7B while being bent toward a side where the second driving electrode 7B is disposed by using the base 4Bd of the columnar vibrator 4B as a fixed end.

In addition, the first capacitive electrode 8B is disposed below the first driving electrode 6B (correctly speaking, the first capacitive electrode 8B is formed integrally with the columnar vibrator 4B, that is, imaginarily disposed) and the second capacitive electrode 9B is disposed below the second driving electrode 7B (correctly speaking, the second capacitive electrode 9B is formed integrally with the supporting wall 5B, that is, imaginarily disposed). Accordingly, as the columnar vibrator 4B is rotated, an opposite distance between the first capacitive electrode 8B and the second capacitive electrode 9B is decreased. As a result, the electrostatic capacitance between the first capacitive electrode 8B and the second capacitive electrode 9B is increased. As described above, it is possible to easily change the electrostatic capacitance between the first capacitive electrode 8B and the second capacitive electrode 9B to a desired capacitance.

In addition, in the same manner as in the first embodiment, a large electrostatic capacitance can be obtained with a small driving voltage by rotating the columnar vibrator 4B in a resonating frequency. Moreover, in the same manner as in the first embodiment, it is possible to smoothly rotate the columnar vibrator 4B by applying a driving voltage having a sinusoidal wave to the second driving electrode 7B.

The variable capacitance element 2B according to the second embodiment is greatly different from the variable capacitance element 2A according to the first embodiment in that the first capacitive electrode 8B is not formed integrally with the first driving electrode 6B and the first capacitive electrode 8B is not grounded, as shown in FIGS. 11 to 13. By forming the variable capacitance element 2B as described above, the other circuits may be connected to both the first capacitive electrode 8B and the second capacitive electrode 9B or the first capacitive electrode 8B may be grounded. That is, a degree of freedom of connection between other circuits and the variable capacitance element 2B can be increased. In addition, since the first driving electrode 6B can be made of a metal by forming the first capacitive electrode 8B and the first driving electrode 6B individually, it is possible to obtain a larger electrostatic force than in a case in which the first driving electrode 6B is formed of a silicon like the first embodiment.

In addition, effects that can be obtained through the up and down arrangement of the second driving electrode 7B and the second capacitive electrode 9B, formation of the columnar vibrator 4B having the cylindrical shape and circular surrounding of the supporting wall 5B, etching of the columnar vibrator 4B and the supporting wall 5B that is performed with a silicon or an SOI using the RIE, and integral formation of the columnar vibrator 4B and the first capacitive electrode 8B and integral formation of the supporting wall 5B and the second capacitive electrode 9B are the same as those in the first embodiment.

Figure 15:
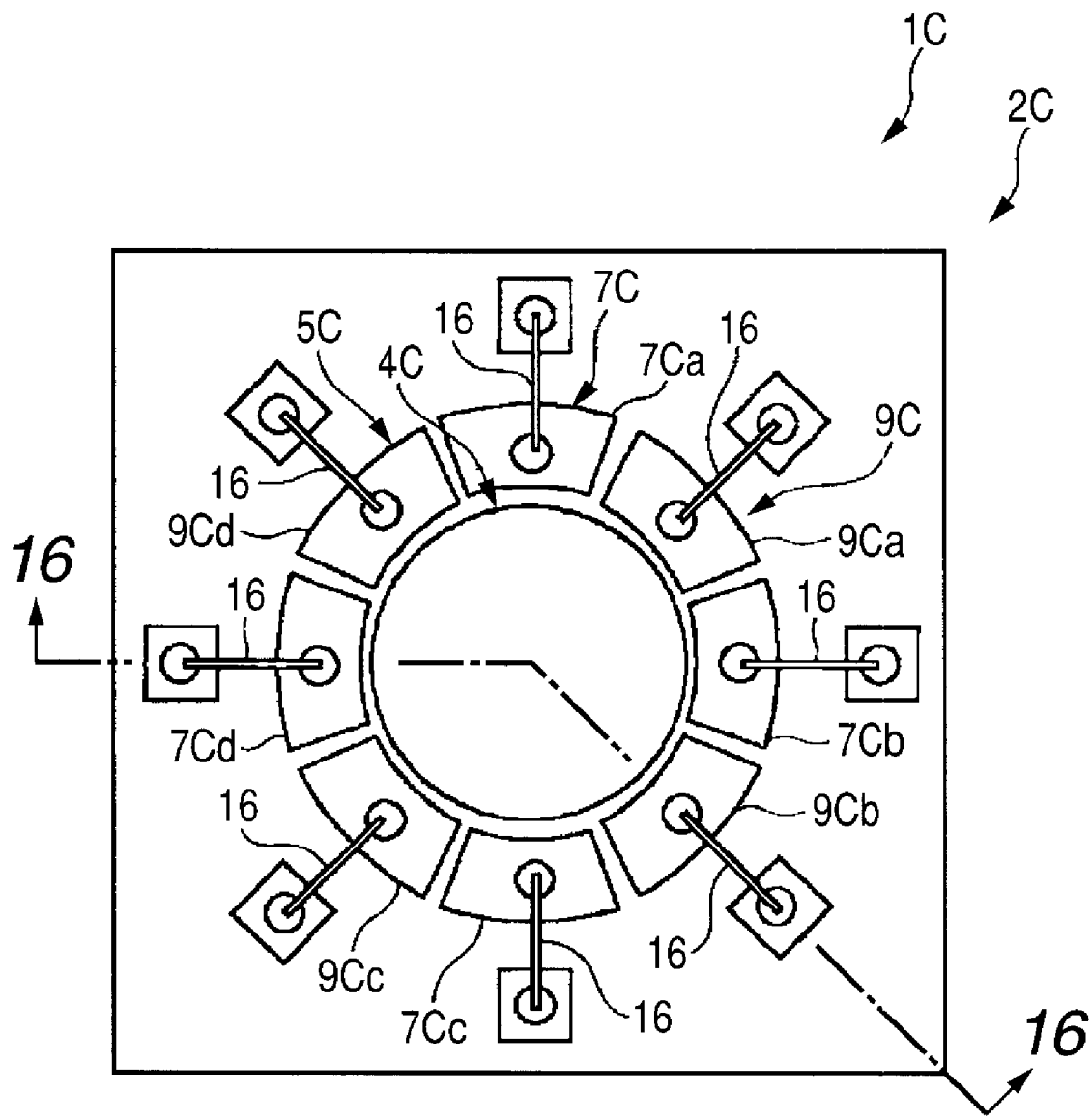
FIG. 15 is a plan view illustrating a variable capacitance element according to a third embodiment.

Next, a variable capacitance device 1C and a variable capacitance element 2C according to a third embodiment will be described with reference to FIGS. 15 to 16. FIG. 15 is a plan view illustrating the variable capacitance element 2C according to the third embodiment, and FIG. 16 is a cross-sectional view taken along the line XVI-XVI of FIG. 15.

Figure 16:
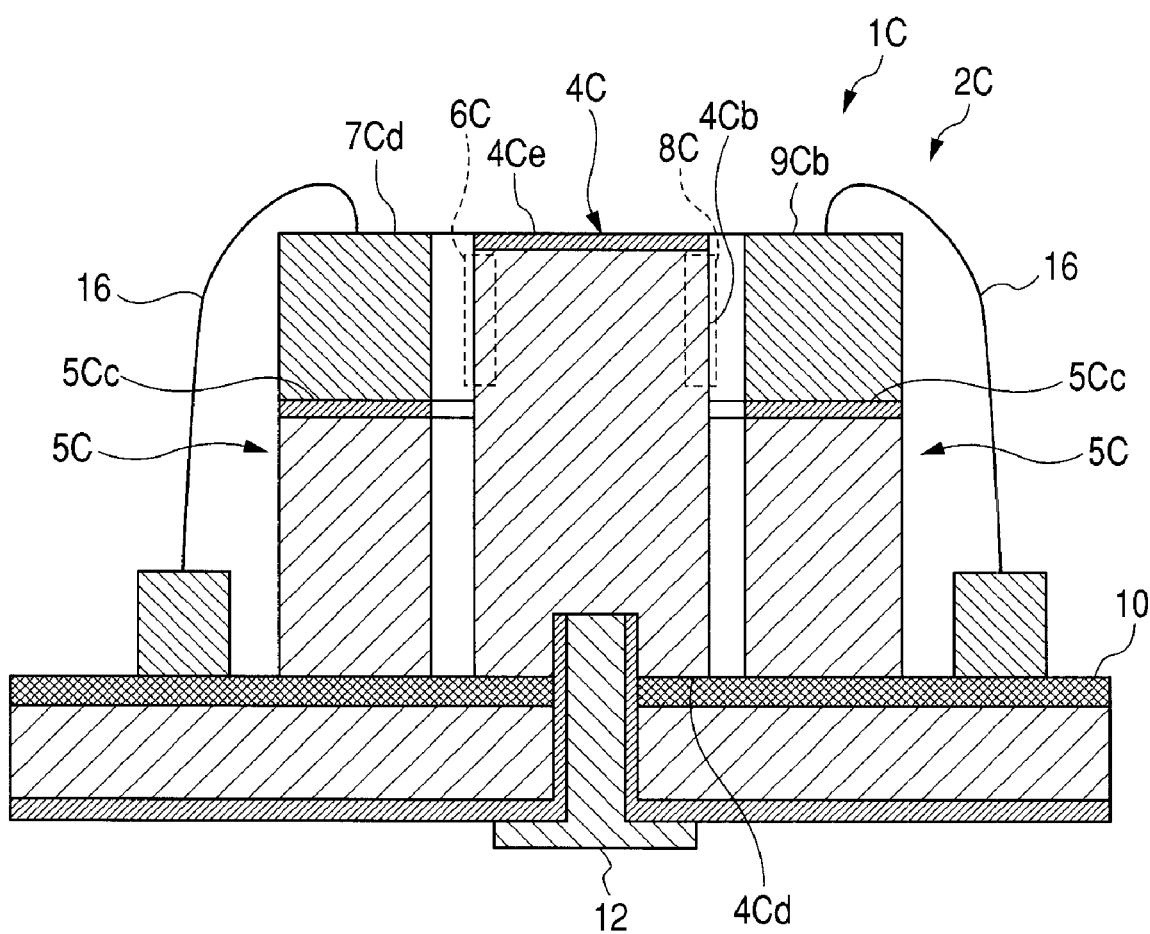
FIG. 16 is a cross-sectional view taken along the line XVI-XVI of FIG. 15.

The variable capacitance device 1C according to the third embodiment includes the variable capacitance element 2C, which is shown in FIGS. 15 and 16, and an external power supply 3 (not shown), in the same manner as the variable capacitance device 1A according to the first embodiment. An equivalent circuit of the variable capacitance device 1C is the same as the equivalent circuit of the variable capacitance device 1A according to the first embodiment, which is shown in FIG. 3. The variable capacitance device 1A according to the first embodiment is different from the variable capacitance device 1C according to the third embodiment in a point of the variable capacitance element 2C. The variable capacitance element 2A according to the first embodiment is different from the variable capacitance element 2C according to the third embodiment according to whether or not a second driving electrode 7C and a second capacitive electrode 9C are arranged in the up and down direction (first embodiment) or the second driving electrode 7C and the second capacitive electrode 9C are alternately arranged on the periphery of the same imaginary circular ring (third embodiment), as shown in FIGS. 1, 2, 15, and 16. Other parts are different but are not largely different. Accordingly, the following explanation will be made focusing on the different point described above.

As shown in FIGS. 15 and 16, the variable capacitance element 2C according to the third embodiment includes: a cylindrical columnar vibrator 4C which stands up from an insulating layer 10; a supporting wall 5C which has a larger diameter than that of the columnar vibrator 4C and stands up from the insulating layer 10, a first driving electrode 6C, a second driving electrode 7C, a first capacitive electrode 8C, and a second capacitive electrode 9C. In the same manner as the columnar vibrator 4A in the first embodiment, the columnar vibrator 4C is formed in a cylindrical shape by etching an upper silicon 30c of an SOI by means of the Deep-RIE (see FIGS. 5A to 5J). In addition, the supporting wall 5C is formed in a shape in which a cylinder is divided into eight equal parts by etching the upper silicon 30c of the SOI by means of the Deep-RIE.

In the same manner as in the first embodiment, the first driving electrode 6C and the first capacitive electrode 8C are formed integrally with the columnar vibrator 4C and are supported on the columnar vibrator 4C as a surface layer of the columnar vibrator 4C. In addition, a first extended electrode 12 serving as an extended electrode for the first driving electrode 6C and the first capacitive electrode 8C is formed in the same manner as in the first embodiment. The first extended electrode 12 extends passing through the insulator 10 of the SOI from a base 4Cd of the columnar vibrator 4C.

The shapes of the second driving electrode 7C and the second capacitive electrode 9C that are supported by the supporting wall 5C are different from those of the second driving electrode 7A and the second capacitive electrode 9A in the first embodiment. As shown in FIGS. 15 and 16, the second driving electrode 7C and the second capacitive electrode 9C are formed by individually connecting the conductive wire 16 to a circular conductive member, which is formed by performing electroplating on an upper end surface 5Cc of the supporting wall 5C so as to be divided into eight parts. A difference between the second driving electrode 7C and the second capacitive electrode 9C is a difference of connection destinations of the conductive wire 16. If the conductive wire 16 is connected to the external power supply 3, parts 7Ca to 7Cd of the conductive member serve as the second driving electrode 7C. If the conductive wire 16 is connected to another circuit, parts 9Ca to 9Cd of the conductive member serves as the second capacitive electrode 9C. By changing the connection destination alternately as shown in FIG. 15, the second driving electrode 7C and the second capacitive electrode 9C are alternately and separately arranged on the periphery of the same circular ring above the supporting wall 5C. In addition, since the cylindrical conductive member divided into the eight equal parts is alternately used as the second driving electrode 7C and the second capacitive electrode 9C, the second driving electrode 7C and the second capacitive electrode 9C are arranged to be shifted by 90°.

Next, operations of the variable capacitance device 1C and the variable capacitance element 2C according to the third embodiment will be described with reference to FIGS. 15 to 16.

The variable capacitance device 1C according to the third embodiment includes the variable capacitance element 2C shown in FIG. 16 and the external power supply 3 (not shown). In the same manner as in the first embodiment, when four driving voltages (see FIGS. 4A to 4E) having a sinusoidal wave and a phase difference of 90° are sequentially applied from the external power supply 3 to the divided parts 7Ca to 7Cd of the second driving electrode 7C in the circumferential direction (direction of the part 7Ca->part 7Cb->part 7Cc->part 7Cd or an opposite direction) thereof while shifting the driving voltage by 90°, a driving voltage between the first driving electrode 6C and the second driving electrode 7C sequentially increases or decreases in the circumferential direction of the second driving electrode 7C. As a result, an electrostatic force sequentially increases or decreases in the circumferential direction of the second driving electrode 7C. Since the increase or decrease in electrostatic force occurs in the circumferential direction of the second driving electrode 7C, a front end 4Ce of the columnar vibrator 4C is rotated in the circumferential direction of the second driving electrode 7C while being bent toward a side where the second driving electrode 7C is disposed by using the base 4Cd of the columnar vibrator 4C as a fixed end. Moreover, in the same manner as in the first and second embodiments, resonance is used for the rotation of the columnar vibrator 4C. As a result, a large electrostatic capacitance can be obtained with a small driving voltage.

Here, a second pair of electrodes 7C and 9C including the second driving electrode 7C and the second capacitive electrode 9C are alternately arranged on the same periphery of an imaginary circular ring which surrounds an upper end of the columnar vibrator 4C. In addition, a first pair of electrodes 6C and 8C including the first driving electrode 6C and the first capacitive electrode 8C are formed integrally with the columnar vibrator 4C. That is, the first pair of electrodes 6C and 8C are imaginarily disposed on the upper end of the columnar vibrator 4C in correspondence with the arrangement of the second pair of electrodes 7C and 9C. Accordingly, as the columnar vibrator 4C is rotated, the opposite distance between the first capacitive electrode 8C and the second capacitive electrode 9C is decreased. As a result, the electrostatic capacitance between the first capacitive electrode 8C and the second capacitive electrode 9C is increased. As described above, it is possible to easily change the electrostatic capacitance between the first capacitive electrode 8C and the second capacitive electrode 9C to a desired capacitance.

The variable capacitance element 2C according to the third embodiment is characterized in that the first driving electrode 6C, the first capacitive electrode 8C, the second driving electrode 7C, and the second capacitive electrode 9C are arranged on the same periphery above the outer side surface 4Cb of the columnar vibrator 4C or on the upper end surface 5Cc of the supporting wall 5C. If the first driving electrode 6C, the first capacitive electrode 8C, the second driving electrode 7C, and the second capacitive electrode 9C are arranged on the same periphery, when the columnar vibrator 4C is deflected toward the second driving electrode 7C side due to the electrostatic force, the opposite distance between the first capacitive electrode 8C and the second capacitive electrode 9C can be made smaller than that in the case where the first driving electrode 6C, the first capacitive electrode 8C, the second driving electrode 7C, and the second capacitive electrode 9C are arranged in the up and down direction like the first embodiment (refer to the first embodiment or the second embodiment).

In addition, since the second capacitive electrode 9C can be made of a metal by forming the second capacitive electrode 9C on the upper end surface 5Cc of the supporting wall 5C by plating, it is possible to obtain a larger electrostatic force than in a case in which the first driving electrode 6B is formed of a silicon like the first embodiment.

In addition, effects that can be obtained through application of a driving voltage having a sinusoidal wave, formation of the columnar vibrator 4C having the cylindrical shape and circular surrounding of the supporting wall 5C, etching of the columnar vibrator 4C and the supporting wall 5C that is performed with a silicon or an SOI using the RIE, and integral formation of the columnar vibrator 4C and the first capacitive electrode 8C and integral formation of the supporting wall 5C and the second capacitive electrode 9C are the same as those in the first embodiment.

That is, in the variable capacitance devices 1A to 1C and the variable capacitance elements 2A to 2C according to the first to third embodiments, resonance can be used for the rotation of each of the columnar vibrators 4A to 4C without depending on the bent amount of each of the columnar vibrators 4A to 4C. Accordingly, a desired electrostatic capacitance can be obtained even if a driving voltage is small. Therefore, an effect that a large electrostatic capacitance can be obtained with small power consumption is achieved.

In addition, the invention is not limited to the embodiments described above but various changes and modifications thereof could be made as needed.

Figure 17:
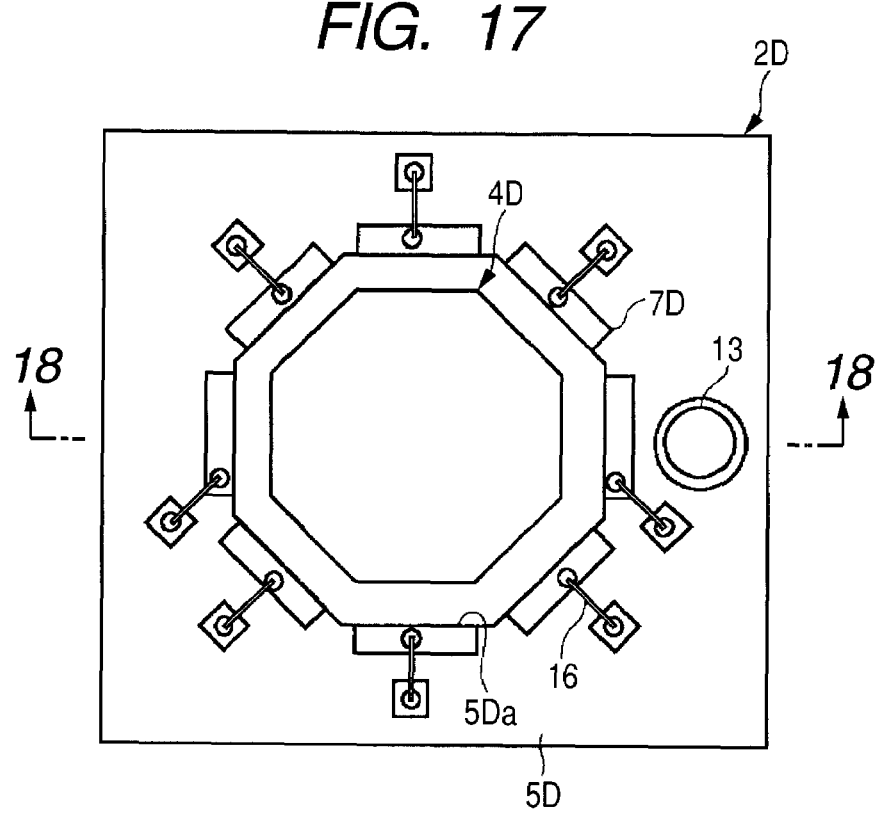
FIG. 17 is a plan view illustrating a variable capacitance element according to another embodiment.
Figure 18:
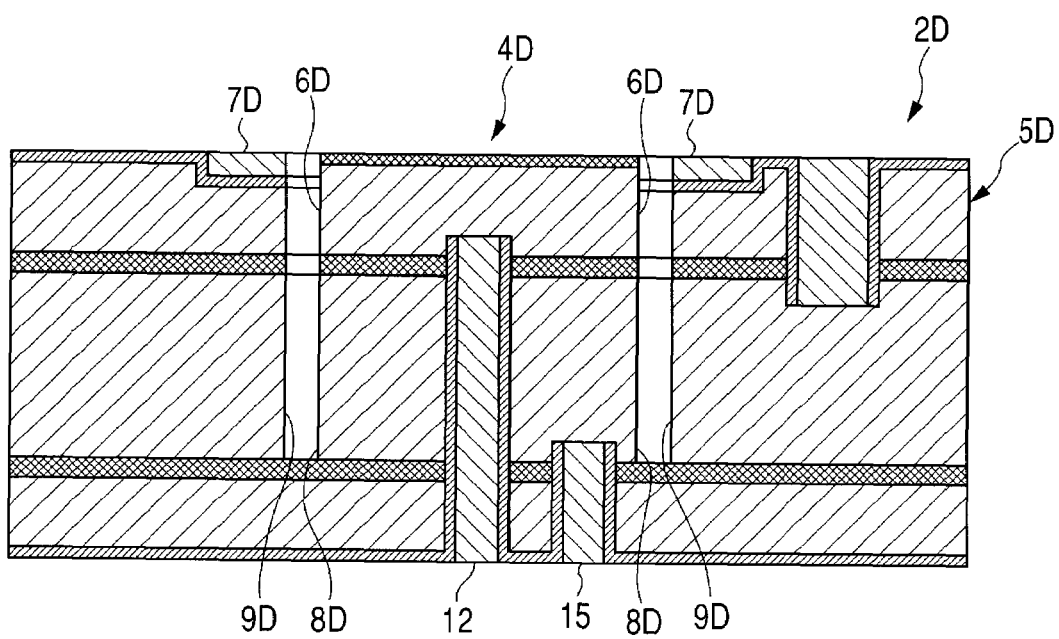
FIG. 18 is a cross-sectional view taken along the line XVIII-XVIII of FIG. 17.

For example, as shown in FIGS. 17 and 18, a columnar vibrator 4D may be formed in a prismatic shape, such as an octagonal column, in a variable capacitance element 2D according to another embodiment. In this case, it is preferable to form a supporting wall 5D (see FIGS. 17 and 18) having an octagonal hole 5Da similar to the first embodiment or a supporting wall 5D (not shown) that surrounds the columnar vibrator 4D similar to the second or third embodiment in the octagonal shape. In addition, in the case when a first driving electrode 6D and a first capacitive electrode 8D that are supported (correctly speaking, imaginarily supported) by the columnar vibrator 4D are integrally formed, it is preferable to provide a first extended electrode 12 and a fourth extended electrode 15 connected to the first driving electrode 6D and the first capacitive electrode 8D as shown in FIG. 18. On the other hand, a second driving electrode 7D is formed in a plate shape at the position opposite the first driving electrode 6D so as to be divided by electroplating, and a second capacitive electrode 9D is formed below the second driving electrode 7D integrally with the supporting wall 5D.

Figure 19:
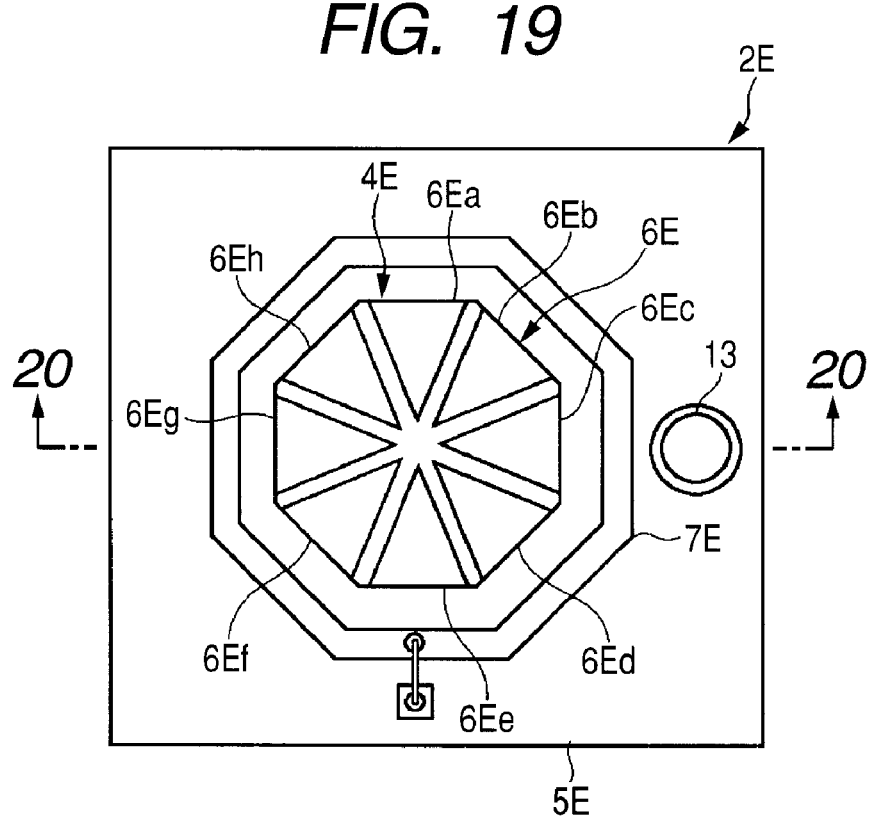
FIG. 19 is a plan view illustrating a variable capacitance element according to still another embodiment.
Figure 20:
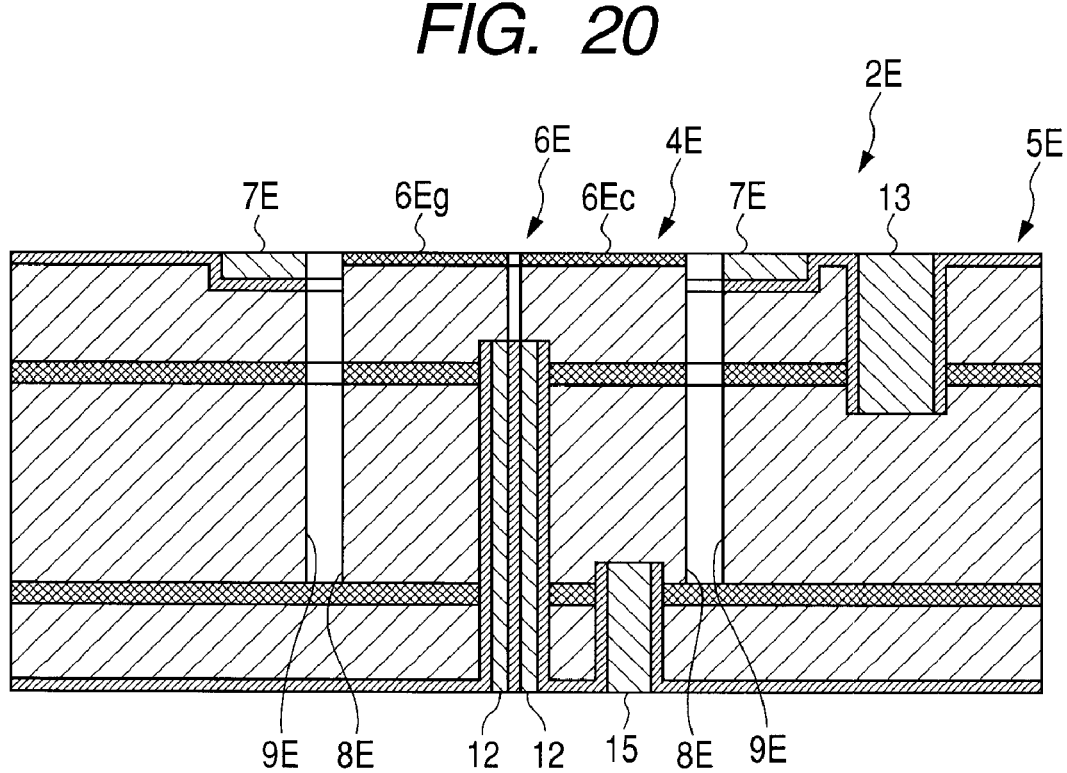
FIG. 20 is a cross-sectional view taken along the line XX-XX of FIG. 19.
Figure 21:
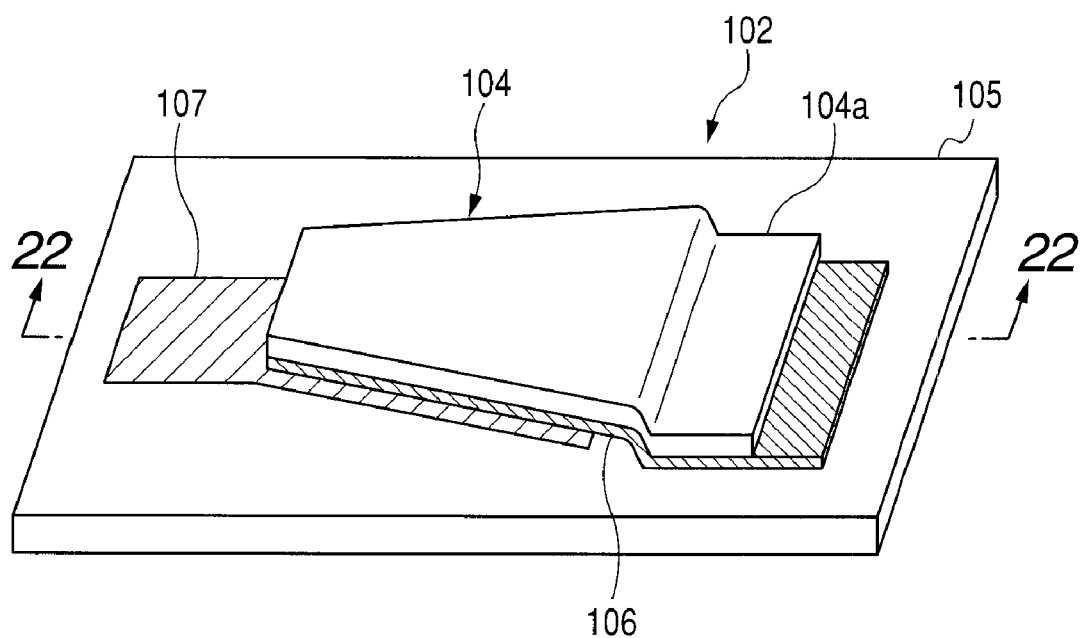
FIG. 21 is a plan view illustrating an example of a known variable capacitance element.
Figure 22:
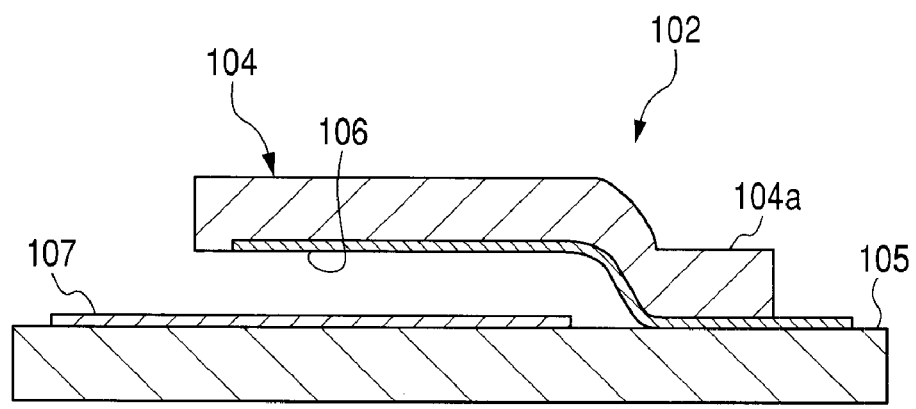
FIG. 22 is a cross-sectional view taken along the line XXII-XXII of FIG. 21.

In addition, at least one of the first driving electrode 6D and the second driving electrode 7D may be divided. Accordingly, as shown in FIGS. 19 and 20, in a variable capacitance element 2E according to another embodiment, a first driving electrode 6E that is formed by plating so as to be divided into eight equal parts, such as cut cake parts 6Ea to 6Eh, may be divided and arranged on the periphery of an imaginary octagonal ring above the columnar vibrator 4E, and a second driving electrode 7E opposite the first driving electrode 6E may be arranged on the periphery of an imaginary octagonal ring that is formed in an octagonal ring shape and surrounds the columnar vibrator 4E. In this case, a first extended electrode 12 is formed for each of the parts 6Ea to 6Eh of the first driving electrode 6E, which are divided, in order to maintain an insulation property.

Moreover, although not shown, in a variable capacitance element according to still another embodiment, it is preferable to include a cover for holding a space between a columnar vibrator and a supporting wall in a vacuum state in order to prevent the columnar vibrator from damping due to air existing between the columnar vibrator and the supporting wall when the columnar vibrator is bent toward the supporting wall side and an opposite distance between a first driving electrode and a second driving electrode from being changed. The shape and size of the cover does not matter as long as the cover has a vacuum holding function. Since the air can be removed from the space between the columnar vibrator and the supporting wall due to the cover, it is possible to reduce or eliminate an adverse effect of damping caused by the air existing between the columnar vibrator and the supporting wall.

The invention claimed is:

1. A rotary variable capacitance element comprising:
   a columnar vibrator that stands up from an insulating surface;
   a first driving electrode and a first capacitive electrode that are disposed on the periphery of an imaginary ring, which surrounds the columnar vibrator on a side surface of the columnar vibrator, or on the periphery of an imaginary ring located above the columnar vibrator;
   a second driving electrode that is spaced apart from the first driving electrode to the outside by a predetermined distance so as to be opposite to the first driving electrode and is disposed on the periphery of an imaginary ring that surrounds the columnar vibrator;

a second capacitive electrode that is spaced apart from the first capacitive electrode to the outside by a predetermined distance so as to be opposite to the first capacitive electrode and is disposed on the periphery of an imaginary ring that surrounds the columnar vibrator; and a supporting wall that stands up from the insulating surface so as to surround the columnar vibrator and supports the second driving electrode and the second capacitive electrode, wherein at least one of the first driving electrode and the second driving electrode are divided into three or more parts and the divided parts are disposed at equal distances, and the columnar vibrator is bent toward an arrangement side of the second driving electrode using a base of the columnar vibrator as a fixed end while being rotated in a circumferential direction of the second driving electrode by sequentially increasing or decreasing a driving voltage applied between the first and second driving electrodes in the circumferential direction of the first driving electrode or the second driving electrode divided into the parts so as to sequentially increase or decrease an electrostatic force generated between the first and second driving electrodes in the circumferential direction, thereby freely changing an opposite distance between the first capacitive electrode and the second capacitive electrode.

2. The rotary variable capacitance element according to claim 1, wherein one pair of electrodes of a first pair of electrodes including the first driving electrode and the first capacitive electrode and a second pair of electrodes including the second driving electrode and the second capacitive electrode are arranged to be divided in an up and down direction of the columnar vibrator or the supporting wall, and the other pair of electrodes are arranged on the supporting wall or the columnar vibrator corresponding to arrangement of the one pair of electrodes.

3. The rotary variable capacitance element according to claim 2, wherein one pair of electrodes of the first pair of electrodes and the second pair of electrodes are grounded and are integrally formed.

4. The rotary variable capacitance element according to claim 1, wherein one pair of electrodes of a first pair of electrodes including the first driving electrode and the first capacitive electrode and a second pair of electrodes including the second driving electrode and the second capacitive electrode are alternately arranged on the periphery of the same imaginary ring, and the other pair of electrodes are arranged on the supporting wall or the columnar vibrator corresponding to arrangement of the one pair of electrodes.

5. The rotary variable capacitance element according to claim 1, wherein the columnar vibrator and the supporting wall are formed by performing reactive ion etching on a single crystal silicon or an SOI (silicon on insulator).

6. The rotary variable capacitance element according to claim 5, wherein the columnar vibrator and the first pair of electrodes are integrally formed using the SOI when the first driving electrode and the first capacitive electrode are not electrically conducted to each other, and the columnar vibrator and the first pair of electrodes are integrally formed using the single crystal silicon or the SOI when the first driving electrode and the first capacitive electrode are electrically conducted to each other.

7. The rotary variable capacitance element according to claim 5, wherein the supporting wall and the second pair of electrodes are integrally formed using the SOI when the second driving electrode and the second capacitive electrode are not electrically conducted to each other, and the supporting wall and the second pair of electrodes are integrally formed using the single crystal silicon or the SOI when the supporting wall and the second pair of electrodes are electrically conducted to each other.

8. The rotary variable capacitance element according to claim 1, wherein the columnar vibrator is formed in a cylindrical shape, and the supporting wall surrounds the cylindrical columnar vibrator in a circular shape.

9. The rotary variable capacitance element according to claim 1, further comprising:

a cover for holding a space between the columnar vibrator and the supporting wall in a vacuum state.

10. A rotary variable capacitance device, comprising:

the rotary variable capacitance element according to claim 1; and an external power supply that applies a driving voltage, which has the same frequency as a resonating frequency of the columnar vibrator, to the first driving electrode or the second driving electrode that is divided into the parts, a phase of the driving voltage being changed in accordance with an arrangement angle of the first driving electrode or the second driving electrode that is disposed on the periphery of the imaginary ring so as to be divided into the parts.

11. The rotary variable capacitance device according to claim 10, wherein the external power supply applies a driving voltage having a sinusoidal wave to the divided first or second driving electrode.

* * * * *